(12) United States Patent
Zhang et al.

(10) Patent No.: US 12,167,272 B2
(45) Date of Patent: Dec. 10, 2024

(54) LATENCY ENHANCEMENTS WITH MULTI-LINK OPERATIONS

(71) Applicant: QUALCOMM Incorporated, San Diego, CA (US)

(72) Inventors: Xiaoxin Zhang, Sunnyvale, CA (US); Parthiban Ellappan, Virudhunagar (IN)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 17/471,394

(22) Filed: Sep. 10, 2021

(65) Prior Publication Data

US 2023/0077702 A1    Mar. 16, 2023

(51) Int. Cl.
  *H04W 28/02*    (2009.01)
  *H04L 43/0852*   (2022.01)
  *H04W 24/08*    (2009.01)
  *H04W 56/00*    (2009.01)

(52) U.S. Cl.
  CPC ..... *H04W 28/0236* (2013.01); *H04L 43/0852* (2013.01); *H04W 24/08* (2013.01); *H04W 56/0055* (2013.01)

(58) Field of Classification Search
  CPC ............. H04W 28/0236; H04W 24/08; H04W 56/0055; H04L 43/0852
  See application file for complete search history.

(56) References Cited

U.S. PATENT DOCUMENTS

| | | | |
|---|---|---|---|
| 11,304,254 B2* | 4/2022 | Omer | H04L 5/0053 |
| 11,432,285 B2* | 8/2022 | Kaur | H04L 5/0053 |
| 2011/0083132 A1* | 4/2011 | Laor | G06F 9/45533 718/1 |
| 2016/0027141 A1 | 1/2016 | Patel et al. | |
| 2017/0124592 A1* | 5/2017 | Naya | H04W 4/18 |
| 2018/0199104 A1 | 7/2018 | Park et al. | |
| 2018/0206174 A1 | 7/2018 | Zhou et al. | |
| 2021/0168722 A1* | 6/2021 | Reshef | H04L 12/12 |
| 2021/0385644 A1* | 12/2021 | Lumbatis | H04W 8/24 |
| 2021/0409979 A1* | 12/2021 | Wang | H04W 52/0258 |
| 2022/0116192 A1* | 4/2022 | Noh | H04L 5/14 |
| 2023/0029903 A1* | 2/2023 | Singh | H04W 72/1268 |

(Continued)

FOREIGN PATENT DOCUMENTS

JP      6788530 B2 * 11/2020
WO   WO-2018236398 A1 * 12/2018

(Continued)

OTHER PUBLICATIONS

English machine translation of JP-6788530-B2. (Year: 2023).*

(Continued)

*Primary Examiner* — Peter P Chau
(74) *Attorney, Agent, or Firm* — QUALCOMM Incorporated

(57) ABSTRACT

Techniques are provided for reducing signaling latency in multi-link devices (MLDs). An example method of providing latency sensitive information with a MLD includes receiving downlink data packets from a station via a first radio link, performing radio frequency sensing with a second radio link, detecting a latency sensitive event, and transmitting an indication of the latency sensitive event.

20 Claims, 15 Drawing Sheets

(56) References Cited

U.S. PATENT DOCUMENTS

| | | | | |
|---|---|---|---|---|
| 2023/0076285 A1* | 3/2023 | Ko | ............... | H04W 76/15 |
| 2023/0217494 A1* | 7/2023 | Li | ............... | H04W 56/00 |
| | | | | 370/350 |

FOREIGN PATENT DOCUMENTS

| | | | |
|---|---|---|---|
| WO | WO-2022193459 A1 * | 9/2022 | |
| WO | WO-2023009063 A1 * | 2/2023 | |

OTHER PUBLICATIONS

English machine translation of WO2022193459 (Year: 2023).*
International Search Report and Written Opinion—PCT/US2022/038761—ISA/EPO—Oct. 26, 2022.

* cited by examiner

LATENCY ENHANCEMENTS WITH MULTI-LINK OPERATIONS

BACKGROUND

Virtual Reality (VR) systems enable users to explore and immerse themselves in virtual environments which may provide computer generated graphical and audio content. Some VR systems utilize a head mounted device (HMD) to immerse a user in the VR environment. A HMD may cover the eyes of the user with one or more display screens and may have headphones to provide audio to the user. Some HMDs may be configured to communicate with a wireless network, and a remote server may be configured to provide the VR content to the HMD. Some VR applications provide latency sensitive streaming data and the HMD may be configured to provide input data to the VR application. The latency associated with data exchanges between stations in a VR environment may reduce the performance of the VR application, particularly when multiple stations may be competing for over-the-air bandwidth. There exists a need to reduce the latency of communications in a VR environment to increase the quality of the user experience.

SUMMARY

An example method of providing latency sensitive information with a multi-link device according to the disclosure includes receiving downlink data packets from a station via a first radio link, performing radio frequency sensing with a second radio link, detecting a latency sensitive event, and transmitting an indication of the latency sensitive event.

An example method of providing radio frequency sensing object detection information according to the disclosure includes receiving a first set of downlink data packets from a station via a first radio link, receiving a second set of downlink data packets from the station via a second radio link, detecting at least one object using radio frequency sensing with the second radio link, detecting a change in state of an inertial measurement device, and providing an indication of the at least one object to the station in response to the change in state of the inertial measurement device.

An example method of receiving latency sensitive information according to the disclosure includes transmitting a first set of downlink data packets to a user equipment via a first radio link, transmitting a second set of downlink data packets to the user equipment via a second radio link, wherein a schedule for transmitting the second set of downlink data packets is based at least in part on radio frequency sensing operations performed by the user equipment using the second radio link, and receiving latency sensitive information from the user equipment.

Items and/or techniques described herein may provide one or more of the following capabilities, as well as other capabilities not mentioned. A virtual reality (VR) system may utilize a head mounted device (HMD) to immerse a user in a VR environment. The HMD may be a multi-link device (MLD) configured to operate on multiple wireless communication links. A first link may be configured to provide latency sensitive downlink data from a network station to the HMD. A MLD VR HMD may utilize a second link for radio frequency (RF) sensing with variable bandwidths (BW) and variable pulse frequencies. The second link may also be used for data exchanges with the network station. The HMD may include one or more inertial measurement sensors to detect the motions of a user. The RF sensing may also be used to detect the motion of the user. Object detection and motion information may be provided to the network station via uplink data packets or embedded in uplink acknowledgment packets. Utilizing the uplink acknowledgment packets to provide latency sensitive object detection and motion information may improve the quality of a VR experience. Other capabilities may be provided and not every implementation according to the disclosure must provide any, let alone all, of the capabilities discussed.

DETAILED DESCRIPTION

Figure 1:
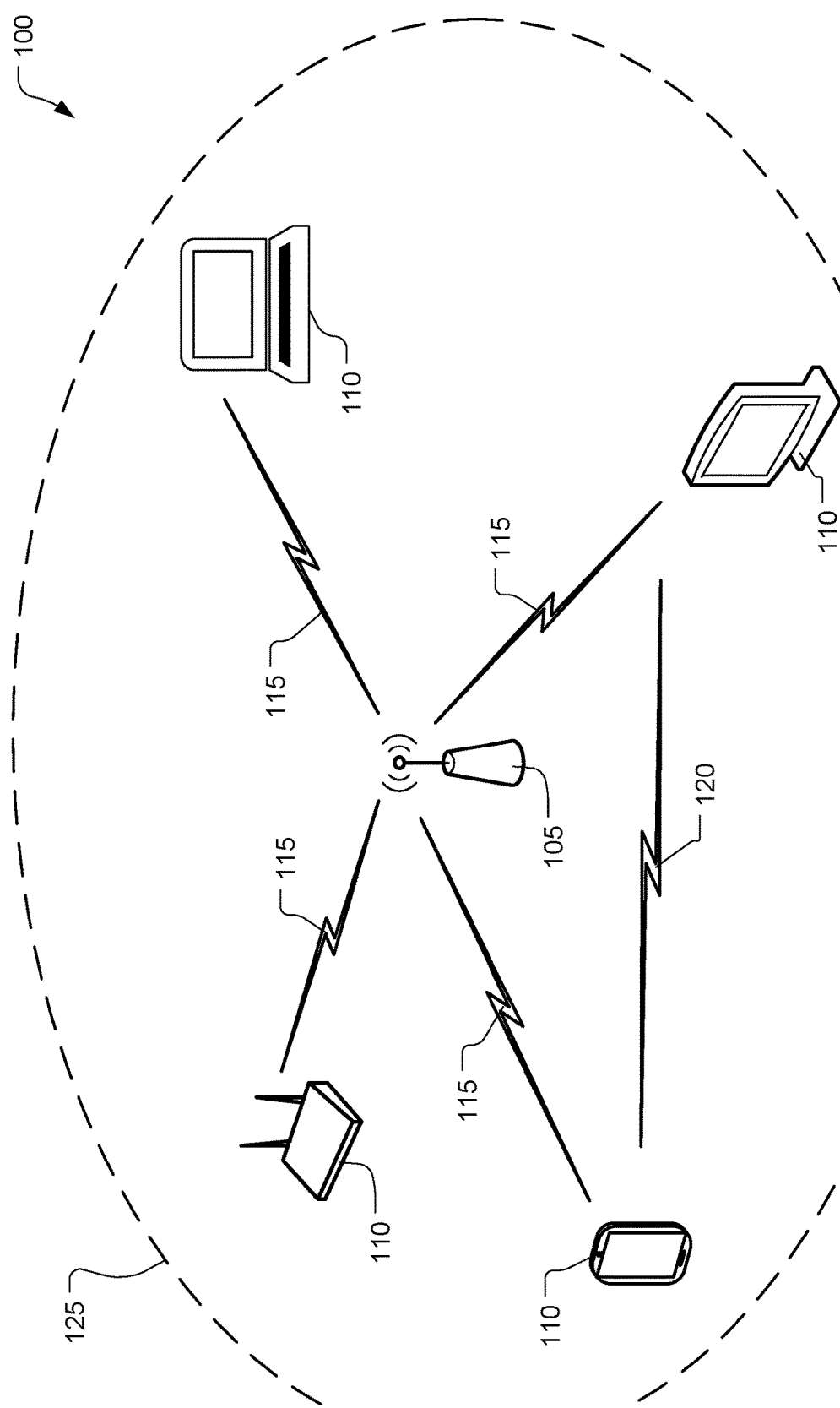
FIG. 1 is a block diagram of an example wireless local area network (WLAN).

Techniques are discussed herein for reducing signaling latency in multi-link devices (MLDs). For example, a user of a virtual reality (VR) system may utilize the relatively powerful VR processing capabilities of an edge server to receive and render video frames in a Head Mounted Device (HMD). In such VR applications, the downlink (DL) and uplink (UL) data communications may be latency sensitive. In an example, an Access Point (AP) in a wireless network may be configured to provide DL data packets including rendered video frames from the edge server to the HMD. Message exchanges between the HMD and AP may cause latency in the DL video frames which may diminish the user experience. Such latency sensitive DL data packets may occupy a large percentage of the airtime between the AP and the HMD which creates a significant challenge for providing urgent messaging (e.g., latency sensitive messages) without impacting the user experience. The techniques provided herein enable message exchanges of latency sensitive information such as object detection information, motion control, user input, and radio frequency sensing control information. In an example, the HMD may be configured to provide latency sensitive information to the AP via one or more wireless links. The potential latency issues may increase with multi-user VR environments where a number of HMDs may contend to send latency sensitive data to an AP.

The signaling techniques provided herein may utilize a multi-link device (MLD) such as a VR headset (e.g., HMD) configured to provide motion and/or object detection information to a wireless node, such as an AP. In an embodiment, the HMD may be configured to use radio frequency (RF) sensing to detect the motion of the user, proximate objects, or other changes to the physical environment. In an example, the RF sensing may be based on Wi-Fi chipsets (e.g., IEEE 802.11be devices) configured to detect motion and measure distances to proximate reflectors (e.g., objects). The HMD may be configured to communicate with a network (e.g., a Wi-Fi AP) asynchronously or synchronously. In an example, both the HMD and the AP may be configured for simultaneous transmit and receive (STR). In an example, a first link between the HMD and the AP may be used exclusively for AP-to-STA (e.g., a HMD) DL-PPDU (Physical Layer Convergence Protocol (PLCP) protocol data unit) and UL block acknowledgement (ACK) to maintain low-latency of DL streaming. A second link between the HMD and the AP may be time shared between RF sensing, UL data, and DL-PPDU data packets. In an example, the UL data may be embedded in an UL block ACK on the first link. In another example, the UL data may be embedded in the UL block ACKs on both or either of the first or second links. These techniques and configurations are examples, and other techniques and configurations may be used.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN network 100 such as, e.g., a network implementing at least one of the IEEE 802.11 family of standards. The WLAN network 100 may include an access point (AP) 105 and one or more wireless devices 110 or stations (STAs) 110, such as mobile stations, head mounted devices (HMDs), personal digital assistants (PDAs), other handheld devices, netbooks, notebook computers, tablet computers, laptops, display devices (e.g., TVs, computer monitors, etc.), printers, IoT devices, etc. While one AP 105 is illustrated, the WLAN network 100 may have multiple APs 105. Each of the wireless devices 110, which may also be referred to as mobile stations (MSs), mobile devices, access terminals (ATs), user equipment(s) (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile. The principles of the present disclosure are described in the context of wireless systems for the purpose of illustration. Nevertheless, it will be understood that these principles are not necessarily limited to wireless systems, and can also be implemented in devices and systems configured to communicate over wired connections.

A wireless device 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) is used to connect APs 105 in an extended service set.

A geographic coverage area 125 for an access point 105 may be divided into sectors making up a portion of the coverage area. The WLAN network 100 may include access points 105 of different types (e.g., metropolitan area, home network, etc.), with varying sizes of coverage areas and overlapping coverage areas for different technologies. In other examples, other wireless devices can communicate with the AP 105.

While the wireless devices 110 may communicate with each other through the AP 105 using communication links 115, each wireless device 110 may also communicate directly with one or more other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include Wi-Fi Direct connections, connections established by using a Wi-Fi Tunneled Direct Link Setup (TDLS) link, 5G-NR sidelink, PC5, and other P2P group connections. The wireless devices 110 in these examples may communicate according to the WLAN radio and baseband protocol including physical and MAC layers from IEEE 802.11, and its various versions including, but not limited to, 802.11b, 802.11be, 802.11g, 802.11a, 802.11n, 802.11ac, 802.11ad, 802.11ah, 802.11ax, and the like. In other implementations, other peer-to-peer connections and/or ad hoc networks may be implemented within WLAN network 100.

Figure 2:
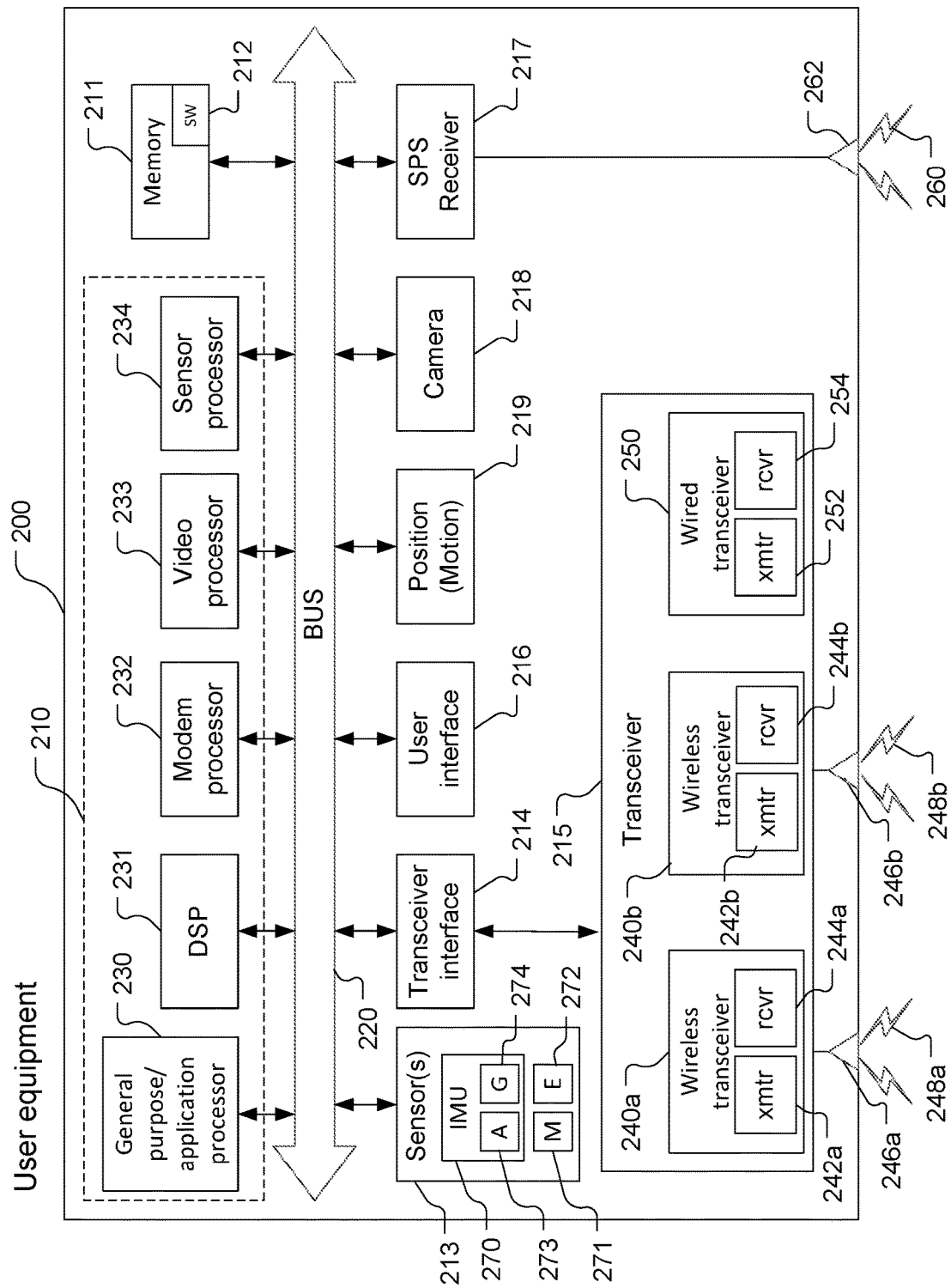
FIG. 2 is a block diagram of components of an example wireless device.

Referring also to FIG. 2, a UE 200 is an example of the wireless devices 110 and comprises a computing platform including a processor 210, memory 211 including software (SW) 212, one or more sensors 213, a transceiver interface 214 for a transceiver 215 (including one or more wireless transceivers such as a first wireless transceiver 240a, a second wireless transceiver 240b, and optionally a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing and ultrasound. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software (which may also include firmware) 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceivers 240a-b. Other example configurations include one or more of the processors 230-234 of the processor 210, the memory 211, the wireless transceivers 240a-b, and one or more of the sensor(s) 213, the user interface 216, the SPS receiver 217, the camera 218, the PMD 219, and/or the wired transceiver 250. Other configurations may not include all of the components of the UE 200. For example, an IoT device may include more wireless transceivers 240a-b, the memory 211 and a general-purpose processor 230. A multi-link device may simultaneously utilize the first wireless transceiver 240a on a first link using a first frequency band, and the second wireless transceiver 240b on a second link using a second frequency band. Additional transceivers may also be used for additional links and frequency bands and radio access technologies.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile. In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include wireless transceivers 240a-b and a wired transceiver 250 configured to communicate with other devices through wireless connections and wired connections, respectively. In an example, each of the wireless transceivers 240a-b may include respective transmitters 242a-b and receivers 244a-b coupled to one or more respective antennas 246a-b for transmitting and/or receiving wireless signals 248a-b and transducing signals from the wireless signals 248a-b to wired (e.g., electrical and/or optical) signals and from wired (e.g., electrical and/or optical) signals to the wireless signals 248*a*-*b*. Thus, the transmitters 242*a*-*b* may be the same transmitter, or may include multiple transmitters that may be discrete components or combined/integrated components, and/or the receivers 244*a*-*b* may be the same receiver, or may include multiple receivers that may be discrete components or combined/integrated components.

The wireless transceivers 240*a*-*b* may be configured to communicate signals (e.g., with access points and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11ax and 802.11be), WiFi, WiFi Direct (WiFi-D), Bluetooth®, Zigbee etc. The wired transceiver 250 may include a transmitter 252 and a receiver 254 configured for wired communication. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with one or more of the antennas 246*a*-*b*. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceivers 240*a*-*b*) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248*a*-*b*) for trilateration or mulilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-purpose processor 230 and the memory 211.

Figure 3:
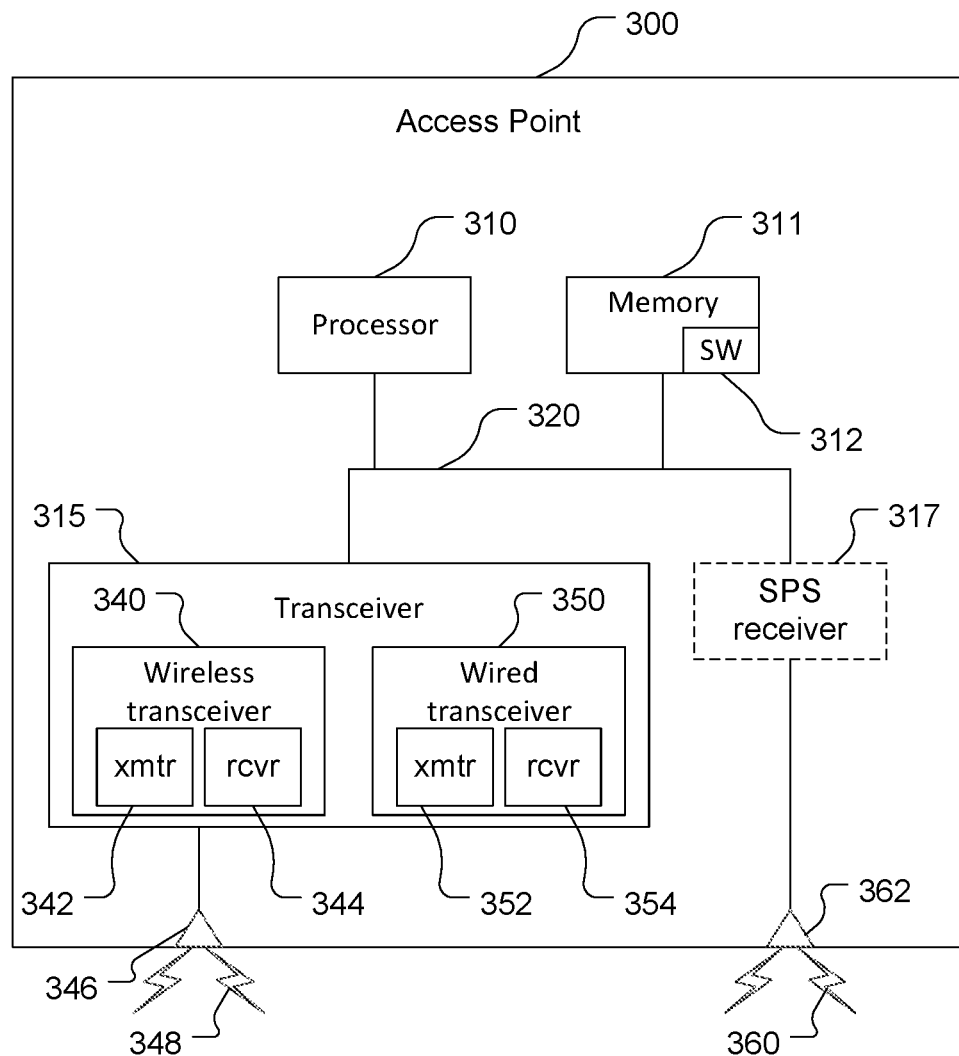
FIG. 3 is a block diagram of components of an example access point.

Referring also to FIG. 3, an example of an access point (AP) 300 such as the AP 105 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the AP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as IEEE 802.11 (including IEEE 802.11ax and 802.11be), WiFi, WiFi Direct (WiFi-D), Bluetooth®, Zigbee etc. The wired transceiver 350 may include a transmitter 352 and a receiver 354 configured for wired communication. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

Figure 4:
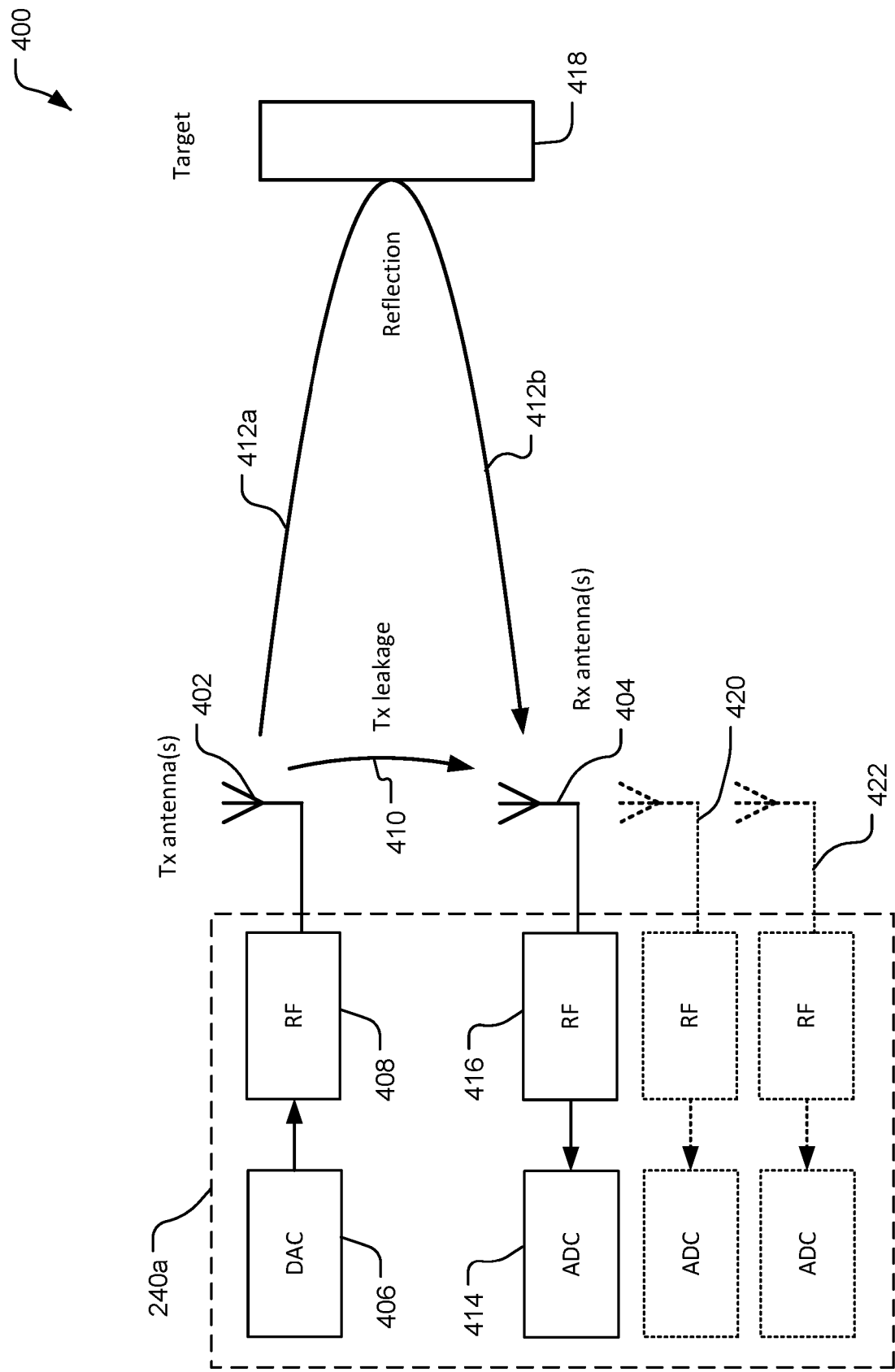
FIG. 4 is a diagram of radio frequency sensing with concurrent transmission and reception by an example wireless device.

Referring to FIG. 4, an example diagram 400 of radio frequency sensing with concurrent transmission and reception by a wireless device is shown. The wireless device, such as the UE 200 or the AP 300, includes a transceiver 240a, or transceiver 340 with a plurality of transmit and receive chains configured for concurrent transmission and reception of RF signals. The number of transmit and receive chains in FIG. 4 are examples, and not limitations, as other transceiver and antenna configurations may be used. For example, the transceiver 240a may be configured for Multiple Input Multiple Output (MIMO) with two transmit and two receive chains. Other array sizes and configurations may be used. In an example, the transceiver 240a may include a transmit chain including a transmit antenna 402 operably coupled to a transmit RF module 408. The transmit RF module 408 is configured to receive a signal from a Digital-to-Analog Converter (DAC) 406 and transmit a corresponding RF signal via the transmit antenna 402. The signal may be generated by a processor such as the modem processor 232 and/or the application processor 230. The transceiver 240a may include one or more receive chains including a receive antenna 404, a receive RF module 416, and an Analog-to-Digital Converter (ADC) 414. Additional receive modules may also be used, such as a second receive chain 420 and a third receive chain 422.

In operation, the wireless device may transmit a radio frequency signal 412a towards a target 418. A reflected signal 412b is the portion of the RF signal 412a that is reflected by the target 418 and received by the one or more receive antennas, such as the receive antenna 404. The additional receive chains may enable beamforming/direction detection to enable the wireless device to compute an angle of arrival (AoA) for a received signal. The receive chains may also receive a transmission leakage 410 concurrently with the transmission of the RF signal 412a. The transmission leakage 410 may be conductive and/or radiated interference depending on the configuration of the wireless device. For example, physical shielding may be used to reduce the radiated interference between the transmit and receive antennas. In an embodiment, the radio frequency signal 412a may be a pre-designed sequence with length 'L'. The pre-designed sequence may be designed to have cyclic autocorrelation properties, such as single carrier Zadoff-Chu sequences, or Orthogonal frequency-division multiplexed (OFDM) like symbols. The sequence may be transmitted repeatedly and continuously for 'n' times, such that the receive chain(s) of the wireless device may start listening at a later time for length 'L' to receive the sequence without missing the signal information. This relaxed time requirement on receive chains means they do not have to start at the same time as the transmitter.

The receive RF module 416 (and the additional receive chains 420, 422) may listen for and receive 'm' number of sequences instead of 1 sequence. For example, the receive RF module 416 may listen for a length of m*L, where 'm' is the number of sequences captured by the receive RF module 416, and m<=n. The UE 200 may combine the received 'm' sequences to improve the signal-to-noise ratio (SNR). The received sequence can be used for RF sensing. For example, a known transmit sequence may be utilized to obtain a channel estimation based on signal correlation techniques. The channel estimation may be processed via an iterative cancellation algorithm to detect leakage and reflection. A time difference between leakage and reflection may be used to estimate a distance to the target 418. Multiple Rx antennas, such as the additional receive chains 420, 422 may be utilized to receive the sequence(s) in the reflected signal 412b, determine the channel estimation, and obtain an angle estimation of the reflected signal 412b. Changes in the channel estimation may be utilized to detect motion of the target 418. Classification algorithms and/or machine learning on the channel estimation results may be used to identify the type of motion and/or size of the target 418. In an example, the channel estimation may be used to detect changes in pose of the target 418.

The number of transmit and receive chains on the wireless device of FIG. 4 is an example, and not a limitation. Other wireless devices may have multiple arrays, and each array may be comprised of different numbers and patterns of antenna elements. For example, an antenna array may include a matrix of elements in a 1×2, 1×4, 1×5, 1×8, 2×2, 2×4, 2×5, 2×8, 3×4, 3×5, 3×8, etc. Other antenna array matrix dimensions may also be used.

In an embodiment, the wireless device with one or more multi-element antenna arrays may be configured to beamform transmitted and receive RF signals. For example, the transceiver 240a may include a radio frequency integrated circuits (RFIC) including with phase shifters to modify the transmit and receive beam gains. The wireless device may be configured to vary the angle of departure (AoD) of the RF signal 412a. In an example, the RF signal 412a may be swept through different AoDs, and the gain of the corresponding reflected signals may be determined. Varying the AoD of the RF signal 412a may be used to determine a direct path to the target 418 (e.g., based on the highest reflected gain). In an example, the beam sweeping may be used to determine changing poses of the object (e.g., based on a series of reflected signals over time). In an embodiment, the transmitted RF signal 412a may be a polarized signal and the polarization of the received signal 412b may be detected. The change in the polarization between the transmitted and received signal may be used to determine characteristics and/or classify the target 418.

Figure 5:
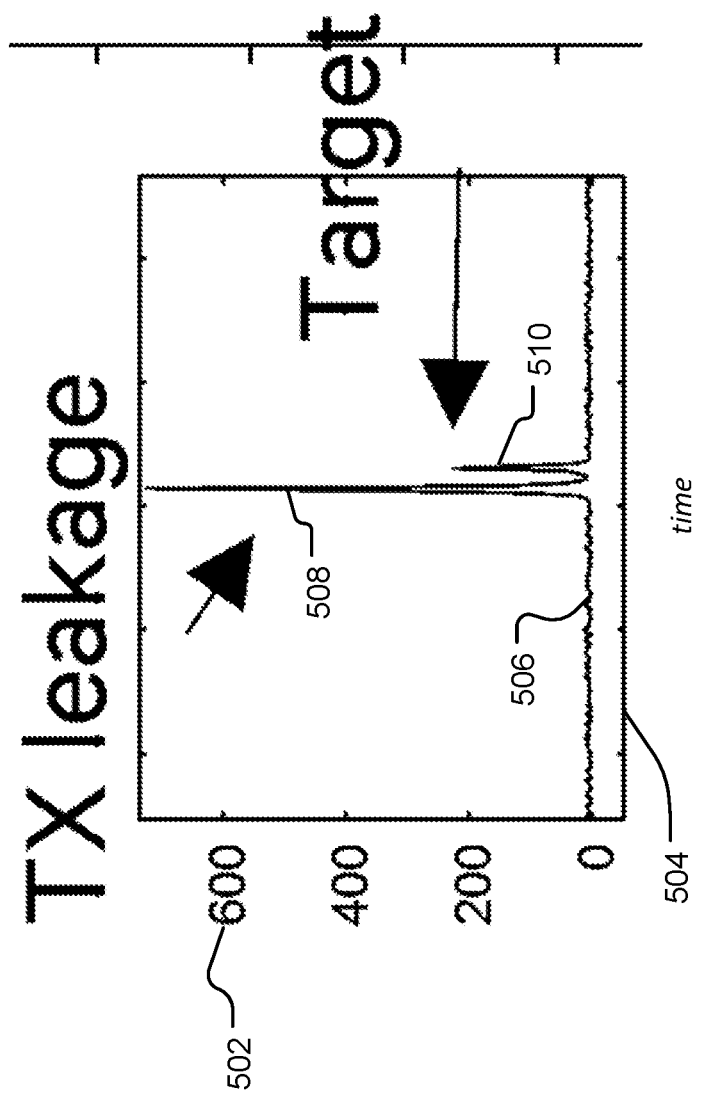
FIG. 5 is a graph of an example receive signal in the wireless device of FIG. 4.

Referring to FIG. 5, with further reference to FIG. 4, a graph 500 of an example receive signal is shown. The graph 500 includes a relative power axis 502, a time axis 504, and a signal response function 506. The signal response function 506 represents the signal detected by the receive antenna 404. A first peak 508 is based on the transmission leakage 410, and a second peak 510 is based on the reflected signal 412b. The RF module 416 (and the other receive chains 420, 422) may be configured to reduce the receive gain for the duration of the transmission of the RF signal 412a. For example, one or more amplifier components (e.g., Low Noise Amplifiers (LNAs)) in the receivers may be configured with adjustable gain functionality. The receive gain may be reduced to lessen the impact of the leakage on the receive chains. Other iterative cancellation algorithms may be used to reduce the impact of the first peak 508 and improve the detection of the second peak 510. The transmission gain of the RF transmit module 408 may be increased to improve the detection of the reflected signal 412b. For example, the transmission gain may be increased iteratively for each of the sequences based on the values of the peak or peaks associated with the reflected signal 412b.

In operation, the signal response function 506 includes the transmitted sequences and the corresponding ADC capture in the ADC module 414 is equivalent to channel capture, which may be utilized to enable channel capture based RF sensing use cases. The time difference between the first peak 508 (i.e., the time of transmission) and the second peak 510 (i.e., the reflected signal 412b) may be utilized to estimate the distance to the target 418. The AoA of the reflected signal 412b may be obtained based on the ADC capture from multiple antennas (e.g., additional receive chains 420, 422). The measured distance and direction information to the target 418 may be used in an indoor mapping application. The bandwidth of the transmitted RF signal 412a may vary and is not limited to a Wi-Fi packet bandwidth. For example, wide bandwidths may be based on the DAC and ADC rates and analog filter bandwidths which may be larger than the Wi-Fi packet bandwidth. The transmission and reception of the RF signals 412a may be performed within hundreds of microseconds and thus the impact on Wi-Fi communications may be minimal. Thus, the RF sensing techniques described herein may be used concurrently with Wi-Fi data exchange functionality.

Figure 6A:
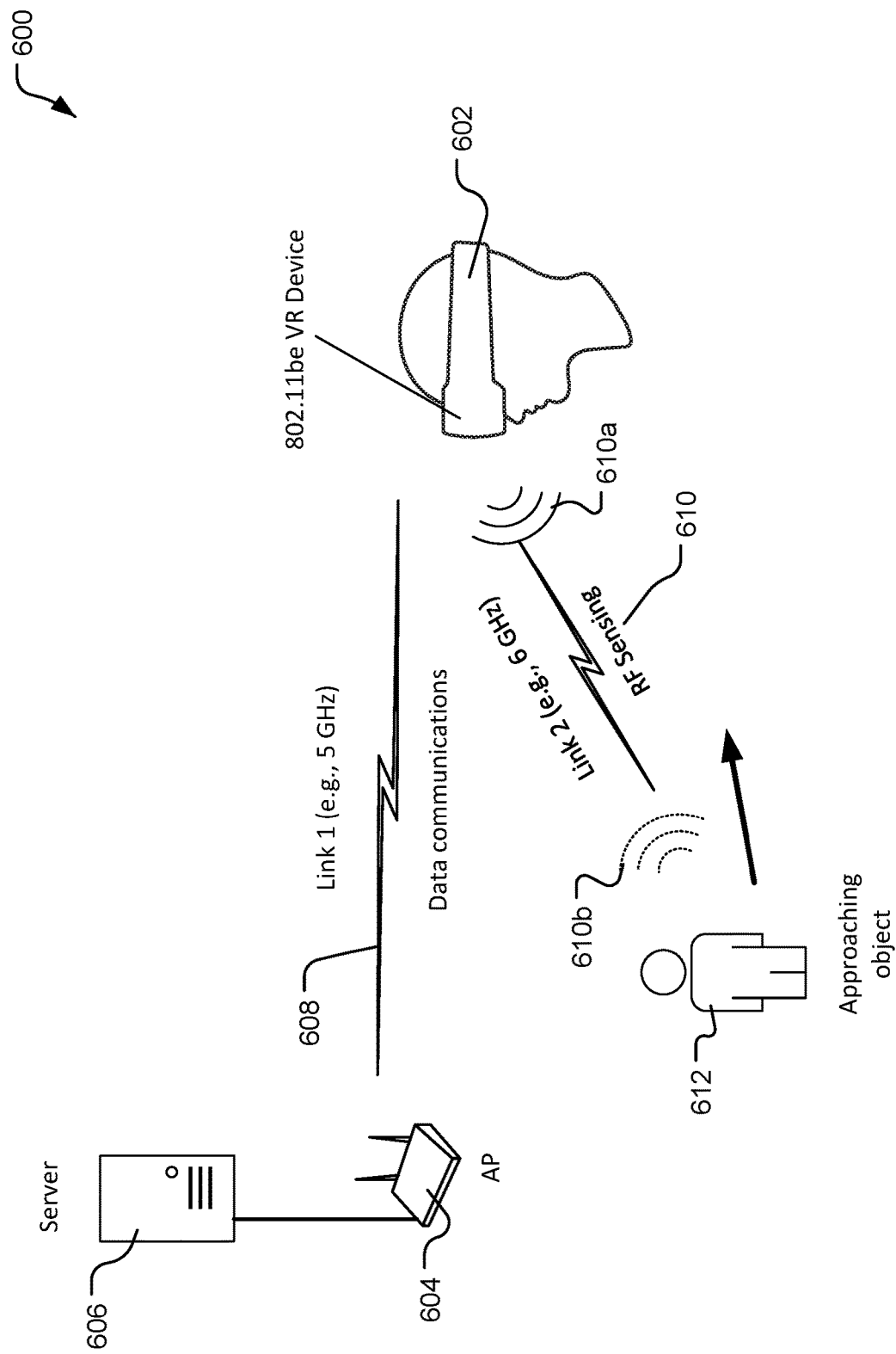
FIG. 6A is a diagram of monostatic motion sensing with an example virtual reality system.

Referring to FIG. 6A, with further reference to FIG. 4, a diagram 600 of monostatic motion sensing with an example virtual reality system is shown. The virtual reality system may include a UE such as a HMD 602. The HMD 602 may include some or all of the components of the UE 200, and the UE 200 may be an example of the HMD 602. The HMD 602 may be configured to operate with the IEEE 802.11be Wi-Fi standard and configured as a multi-link device (MLD) for multi-link operation (MLO). MLO enables devices to simultaneously transmit and receive across different bands and channels. In an embodiment, the HMD 602 may include a plurality of transceivers, such as one or more of the transceiver 240a in FIG. 4. For example, the HMD 602 may utilize multiple transceivers to communicate with an access point (AP) 604 via a first wireless link 608 (e.g., in the Wi-Fi 5 GHz band) while simultaneously communicating or performing RF sensing with a second wireless link 610 (e.g., in the Wi-Fi 6 GHz band). In operation, the AP 604 may be communicatively coupled to a network server 606 (e.g., via a wired or wireless communication link), and configured to send and receive data over the first wireless link 608 with the HMD 602. For example, the network server 606 may be a virtual gaming platform and the user of the HMD 602 may be participating in a virtual gaming experience. The HMD 602 may be configured to simultaneously transmit RF sensing signals, such as depicted in FIG. 4, to detect potential objects which may endanger or interfere with the user. For example, the HMD 602 may utilize the second wireless link 610 to transmit a radio frequency signal 610a and receive a reflected signal 610b from a target object 612 (e.g., an approaching child). The HMD 602 may transmit 200 microsecond RF sensing signals at a periodic interval (e.g., 2 ms) which will utilize a small portion of the transmit time available on the second wireless link 610. In an embodiment, the remaining time on the second wireless link 610 may be used for data traffic with other devices. For example, if the AP 604 is configured for MLO, the HMD 602 may utilize both the first wireless link 608 and the second wireless link 610 for data transfer or other operations in addition to performing RF sensing.

Figure 6B:
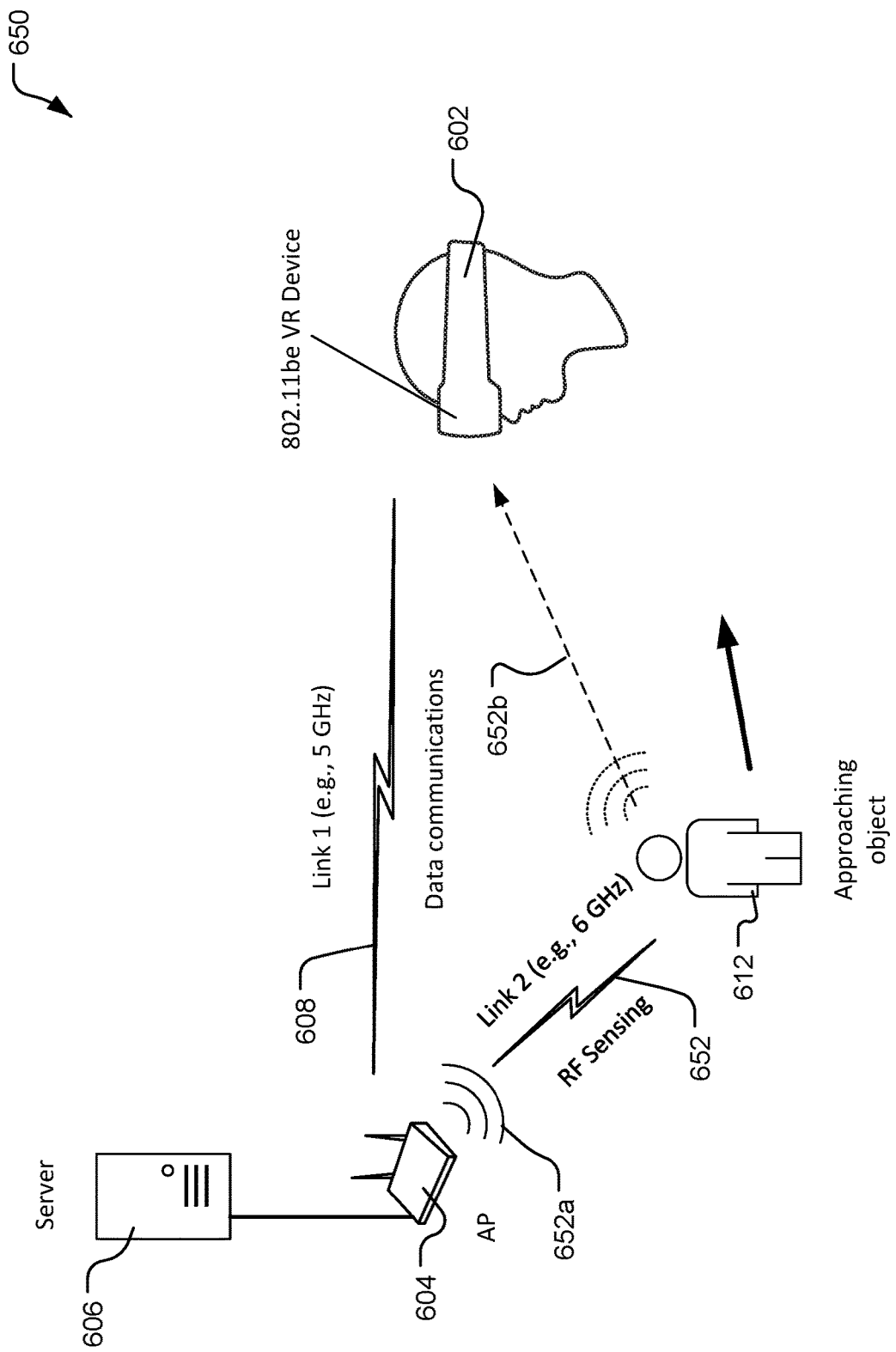
FIG. 6B is a diagram of bistatic motion sensing with an example virtual reality system.

Referring to FIG. 6B, with further reference to FIG. 6A, a diagram 650 bistatic motion sensing with an example virtual reality system is shown. In an embodiment, the AP 604 may be configured for MLO and may utilize a second wireless link 652 to transmit RF sensing signals 652a in one or more directions, such as generally towards the HMD 602. The RF sensing signals 652a may be reflected of objects, such as the target object 612, and a reflected signal 652b may be detected and measured by the HMD 602. For example, during a scanning phase the AP 604 may be configured to transmit one or more sensing-scanning reference signals (SSRS) and one or more stations (e.g., the HMD 602) may be configured to provide beam reports identifying one or more target objects associated with a single SSRS. The HMD 602 may be configured to provide reports via the first wireless link 608 and/or via the second wireless link 652. In an embodiment, The message traffic transmitted from the AP 604 on the first wireless link 608 may be used by the HMD 602 to sense the target object 612, or other objects in the environment. The periodicity of the transmissions on the first wireless link 608 may be controlled by the AP 604. In operation, the HMD 602 may be configured to utilize the second wireless link 652 to request periodic sensing packets to be transmitted from the AP 604 on the second wireless link 652, and the HMD 602 may also utilize the existing traffic on the first wireless link 608 and on the second wireless link 652 to further improve sensing.

Figure 7:
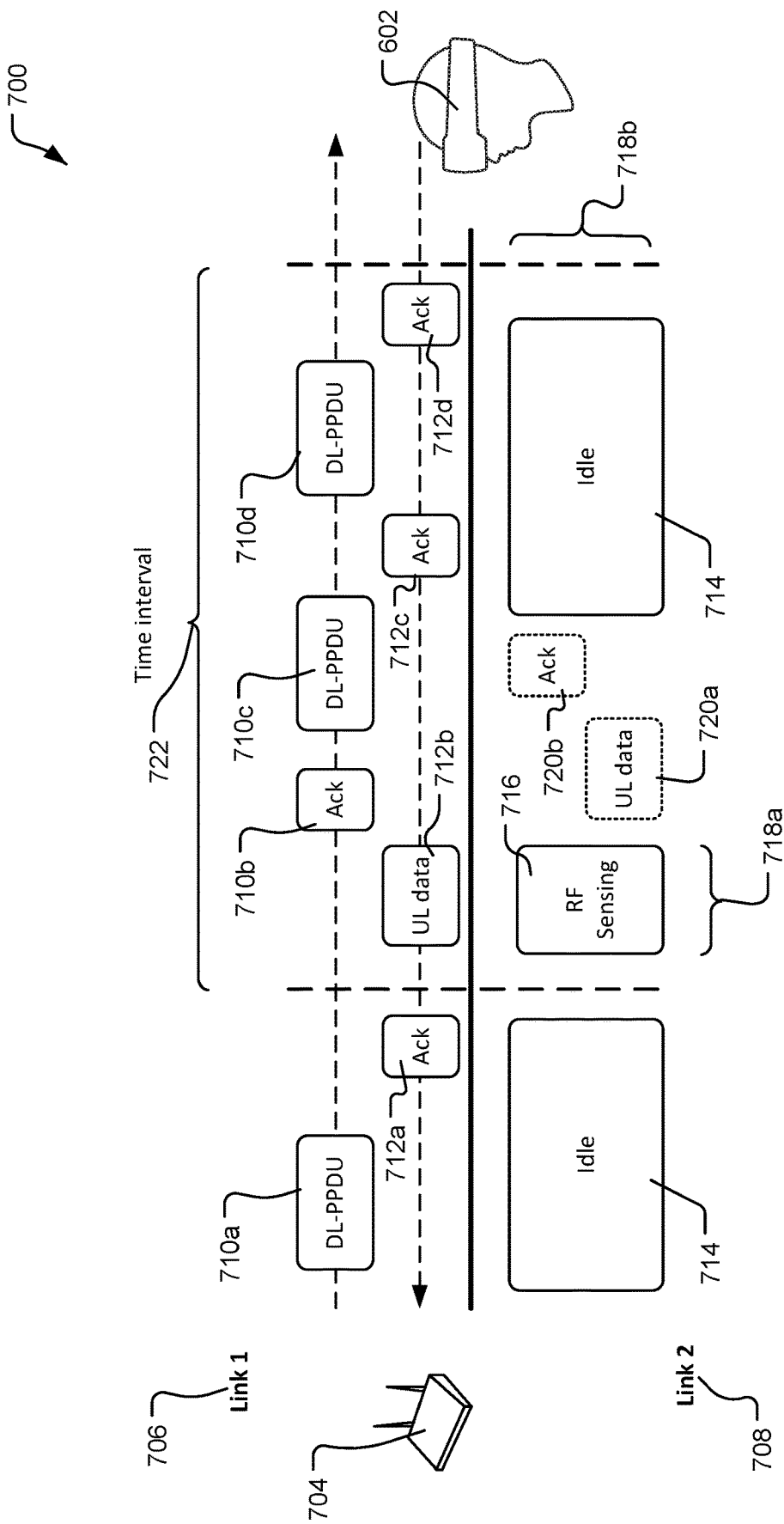
FIG. 7 is an example signal flow diagram for radio frequency sensing with a virtual reality system.

Referring to FIG. 7, with further reference to FIGS. 4, 6A and 6B, an example signal flow diagram 700 for radio frequency sensing with a virtual reality system is shown. The diagram 700 includes the HMD 602 and an AP 704. The AP 704 may be connected to one or more network servers or other devices such as the network server 606 (not shown in FIG. 7). In an embodiment, the HMD 602 is a MLD configured to utilize multiple bands such as the 2.4 GHz, 5 GHz and 6 GHz Wi-Fi bands. A first link 706 may utilize one of the bands and a second link 708 may utilize another one of the bands. In an example, the first link 706 may be used for data exchanges between the AP 704 and the HMD 602, and the HMD 602 may use the second link 708 for RF sensing. The first link 706 may include downlink (DL) data frames such as Physical Layer Convergence Procedure (PLCP) Protocol Data Units (PPDU) and acknowledgment frames transmitted from the AP 704 to the HMD 602, and uplink (UL) acknowledgment and data frames. For example, a first DL-PPDU frame 710a may be transmitted by the AP 704 and the HMD 602 may transmit a first Ack frame 712a in response. The HMD 602 may transmit one or more UL Data frames 712b and the AP 704 may send an Ack frame 710b in response. The AP 704 may send subsequent DL-PPDU frames and receive corresponding Ack frames from the HMD 602, such as a second DL-PPDU frame 710c and a third DL-PDDU frame 710d. The HMD 602 may be configured to transmit the respective second Ack frame 712c and third Ack frame 712d as depicted in the signal flow diagram 700.

The HMD 602 may utilize the second link 708 for RF sensing and other operations. For example, the HMD 602 may perform RF sensing operations 716 such as described in FIG. 4 during a portion of a time interval 722. The RF sensing operations 716 may be performed in a sensing period 718a which is a portion of the time interval 722. The second link 708 is not dedicated to RF sensing and may include idle periods 714 which may be used for other operations. The time interval 722 may be approximately 2 milliseconds and the sensing period 718a may be less than 200 microseconds. Other time periods may also be used. The RF sensing operations 716 may also utilize a varying amount of bandwidth 718b based on power and detection accuracy requirements. For example, a low bandwidth (e.g., 20 MHz) may be used to generate a coarse estimate of the surrounding environment and a higher bandwidth (e.g., 160 MHz) may be used for a finer resolution of the environment. The time interval 722 may also be modified to increase the resolution of RF sensing measurements. In an embodiment, the HMD 602 may be configured to utilize the first link 706 to provide latency sensitive information to a network server via the AP 704 such as motion or object detection information based on the RF sensing operations. In an embodiment, the RF sensing operations 716 may be synchronized with the UL Data frame 712b and the UL Data frame 712b may include an indication of the RF sensing based information. In another example, an Ack frame 712c, 712d may include latency sensitive information.

In an embodiment, the AP 704 may be configured for MLO and may utilize the second link 708 for bistatic RF sensing and data communications with the HMD 602. In an example, the HMD 602 may optionally transmit a UL Data frame 720a to the AP 704 and the AP 704 may send and Ack frame 720b via the second link 708. The HMD 602 may be configured to communicate with other stations, and/or perform other operations with the second link 708 in addition to RF sensing. In an embodiment, the HMD 602 may be configured to send sensing request frames to the AP 704 periodically on the second link 708 (e.g., a UL data frame 720a). The AP 704 may transmit a sensing frame (e.g., during the RF sensing operations 716). The HMD 602 may be configured to receive a sensing frame from AP 704 and use the sensing frame to sense the environment and detect nearby objects and/or determine motion information. In an embodiment, the periodicity (e.g., time interval 722), sensing period 718a, and the bandwidth 718b may be controlled by HMD 602. In an example, a sensing request frame can be QoS Null Frame, and sensing frame can be ACK frame in response to QoS Null Frame. Other frame types may also be used.

Figure 8:
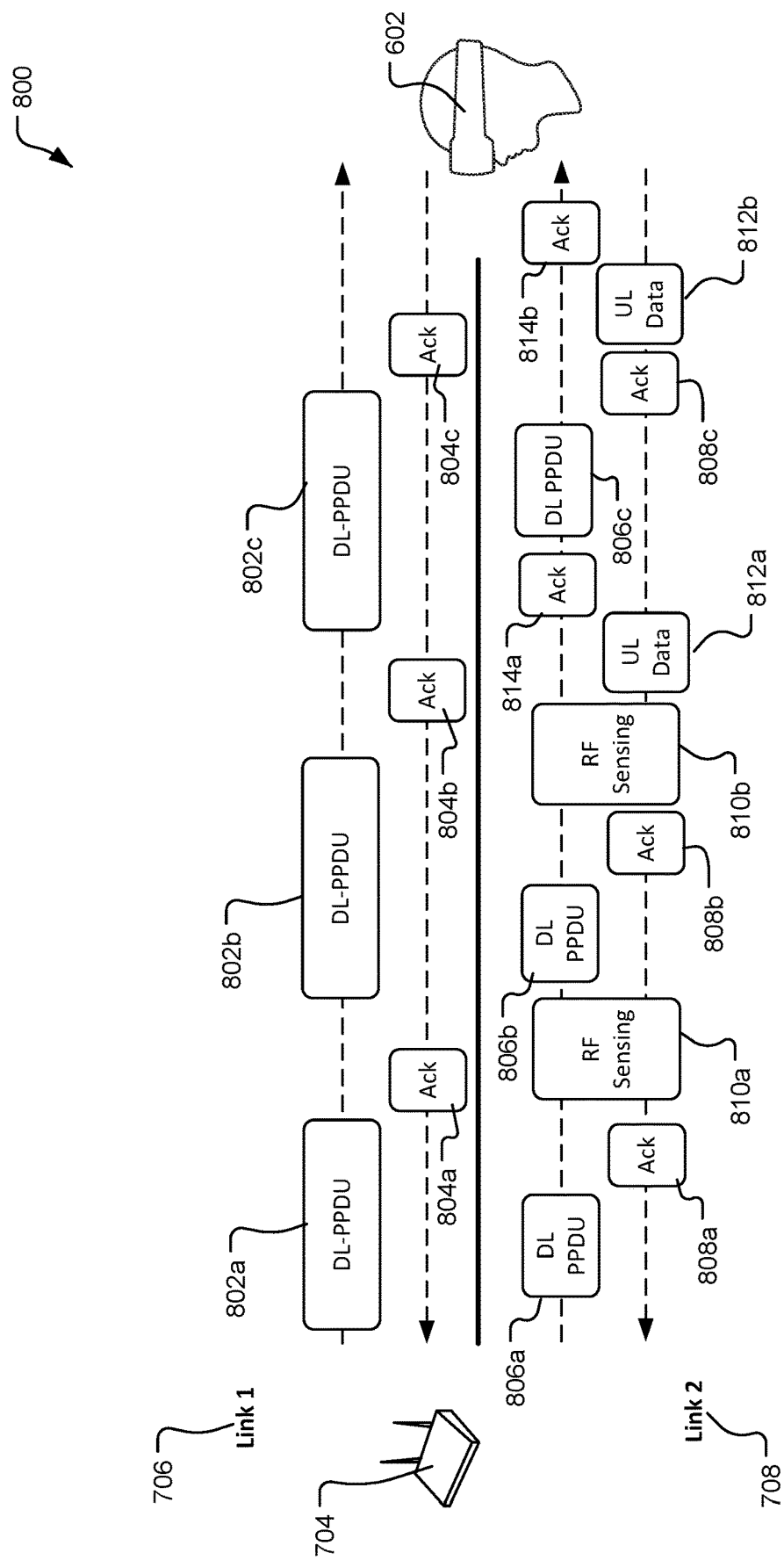
FIG. 8 is an example signal flow diagram for providing latency sensitive indications using asynchronous communications with simultaneous transmit and receive capabilities.

Referring to FIG. 8, with further reference to FIG. 7, an example signal flow diagram 800 for providing latency sensitive indications using asynchronous communications with simultaneous transmit and receive capabilities is shown. The diagram 800 includes the HMD 602 and the AP 704 as described in FIG. 7. In an embodiment, the first link 706 may be used solely for AP-to-STA DL-PPDUs and UL Block acknowledgments to maintain the continuity and low-latency of DL streaming. For example, the DL streaming may include a first DL-PPDU 802a, a second DL-PPDU 802b, and a third DL-PPDU 802c, and the respective block Ack frames 804a, 804b, 804c as depicted in the diagram 800. The second link 708 may time share RF sensing operations as well as UL-Data and additional DL-PPDU. For example, the second link 708 may have configured time periods for a first RF sensing operation 810a and a second RF sensing operation 810b. The RF sensing operations 810a, 810b may be monostatic or bistatic as described in FIGS. 6A and 6B. The time durations and/or bandwidths of the respective RF sensing operations 810a-b may be the same or different. For example, the first RF sensing operation 810a may utilize a bandwidth of 20 MHz for coarse detection, and the second RF sensing operation 810b may utilize a bandwidth of 160 MHz for finer resolution. Other bandwidths may also be used. The second link 708 may also be configured to enable the HMD 602 to provide UL data such as a first UL data frame 812a and a second UL data frame 812b, and receive the corresponding acknowledgements from the AP 704 (e.g., a first Ack frame 814a, and a second Ack frame 814b). The second link 708 may also be configured for providing DL-PPDU frames from the AP 704 to the HMD 602. For example, the AP 704 may transmit a first DL-PPDU 806a, a second DL-PPDU 806b, and a third DL-PPDU 806c, and receive the corresponding acknowledgments from the HMD 602 (e.g., the Ack frames 808a, 808b, 808c).

In an asynchronous mode, the traffic on the second link 708 is not required to be aligned with the traffic on the first link 706. RF sensing and other motion information (e.g., signals from the IMU 270) obtained by the HMD 602 may be embedded in the UL data or the next UL Block Ack to inform the AP 704. For example, latency sensitive information such as object detection based on measurements obtained with the RF sensing operations, indications of a periodicity change for RF sensing operations, or other motion information, may be embedded in one or more block Ack frames on the first link 706 (e.g., Ack frames 804a, 804b, 804c). In an example, the latency sensitive information may be provided to the AP 704 via UL Data or Ack frames on the second link 708 (e.g., UL Data 812a, 812b, Ack frames 808a, 808b, 808c). In general, the RF sensing and/or motion information may utilize the Ack frame or UL Data air time in the next cycle to report the object detection and/or motion information. In an embodiment, different latency sensitive information may utilize different data packets. For example, the UL data 812a, 812b may be utilized for motion data obtained via the IMU 270, and the Ack frames 804a, 804b, 804c may be utilized for reporting object detection based on the RF sensing operations 810a, 810b. In an example, each of the RF sensing operations 810a, 810b may utilize approximately 200 microseconds of airtime and the UL data 812a, 812b may be based on a fixed sized of motion information (e.g., 5, 10, 15, 20, 30 bytes, etc.). The AP 704 may be configured to utilize these known values for the RF sensing operations and UL data to pre-allocate the time for the DL-PPDU 806a, 806b, 806c on the second link 708. In an example, the AP 704 may be configured to transmit one or more radio frequency sensing signals with the second link 708 during a time period when the HMD 602 is performing the radio frequency sensing operations 810a, 810b (e.g., to support bistatic sensing). The pre-allocation may be used to manage contention latency on the second link 708.

Figure 9:
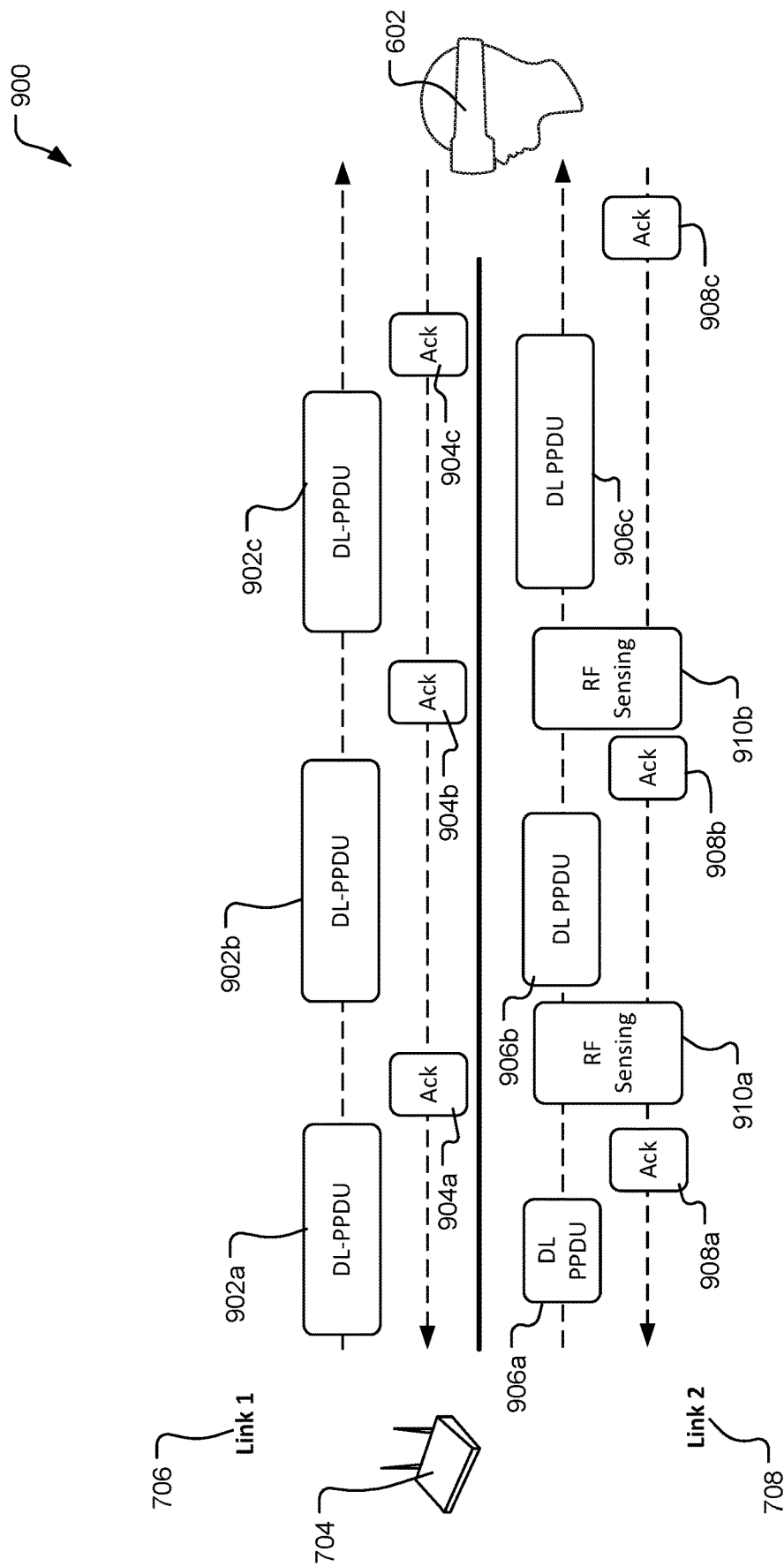
FIG. 9 is an example signal flow diagram for providing latency sensitive indications using acknowledgement blocks in asynchronous communications.

Referring to FIG. 9, with further reference to FIG. 7, an example signal flow diagram 900 for providing latency sensitive indications using block Ack frames in asynchronous communications is shown. The diagram 900 includes the HMD 602 and the AP 704 as described in FIG. 8 and utilizes UL block Ack frames for UL data. In an example, the first link 706 may be used solely for AP-to-STA DL-PPDUs and UL Block acknowledgments to maintain the continuity and low-latency of DL streaming. The DL streaming may include, for example, a first DL-PPDU 902a, a second DL-PPDU 902b, and a third DL-PPDU 902c, and the respective block Ack frames 904a, 904b, 904c as depicted in the diagram 900. The second link 708 may time share RF sensing operations and additional DL-PPDU (i.e., without the UL data packets depicted in FIG. 8). For example, the second link 708 may have configured time periods for a first RF sensing operation 910a and a second RF sensing operation 910b. The time durations and/or bandwidths of the respective RF sensing operations 910a-b may be the same or different. The UL block Ack frames 904a, 904b, 904c may be used to convey UL data to the AP 704. The scheduling of the RF sensing operations 910a-b may be changed based on recent proximity observations and reported to the AP 704 using one or more of the UL block Ack frames 904a, 904b, 904c. The second link 708 may be configured to dynamically change the size of DL-PPDU 906a, 906b, 906c based on the air time required for the RF sensing operations 910a-b. In an embodiment, the scheduling of the RF sensing operations may be based on the information provided in one or more of the UL block Ack frames 904a, 904b, 904c. For example, the presence of a large object or an object on an approach vector may be used to trigger increased airtime for RF sensing operations. Other motion information (e.g., from the IMU 270), such as increased accelerometer measurements may be included in the first link UL block Ack frames 904a, 904b, 904c and the timing and configuration (e.g., duration, bandwidth) of the RF sensing operations may be based at least in part on the motion information. In asynchronous mode, the traffic on the second link 708 does not need to be aligned with the traffic on the first link 706. When RF sensing operations are required, the AP 704 may be configured to modify the size of the DL-PPDU to account for the airtime required for the RF sensing operations. For example, the first DL-PPDU 906a, the second DL-PPDU 906b, and the third DL-PPDU 906c may be different sizes. The AP 704 may determine the size based on airtime for the RF sensing and respective block acknowledgement frames 908a, 908b, 908c, etc. The UL data packets may be eliminated from the second link 708. In this way, the contention latency on the second link 708 may be managed.

Figure 10:
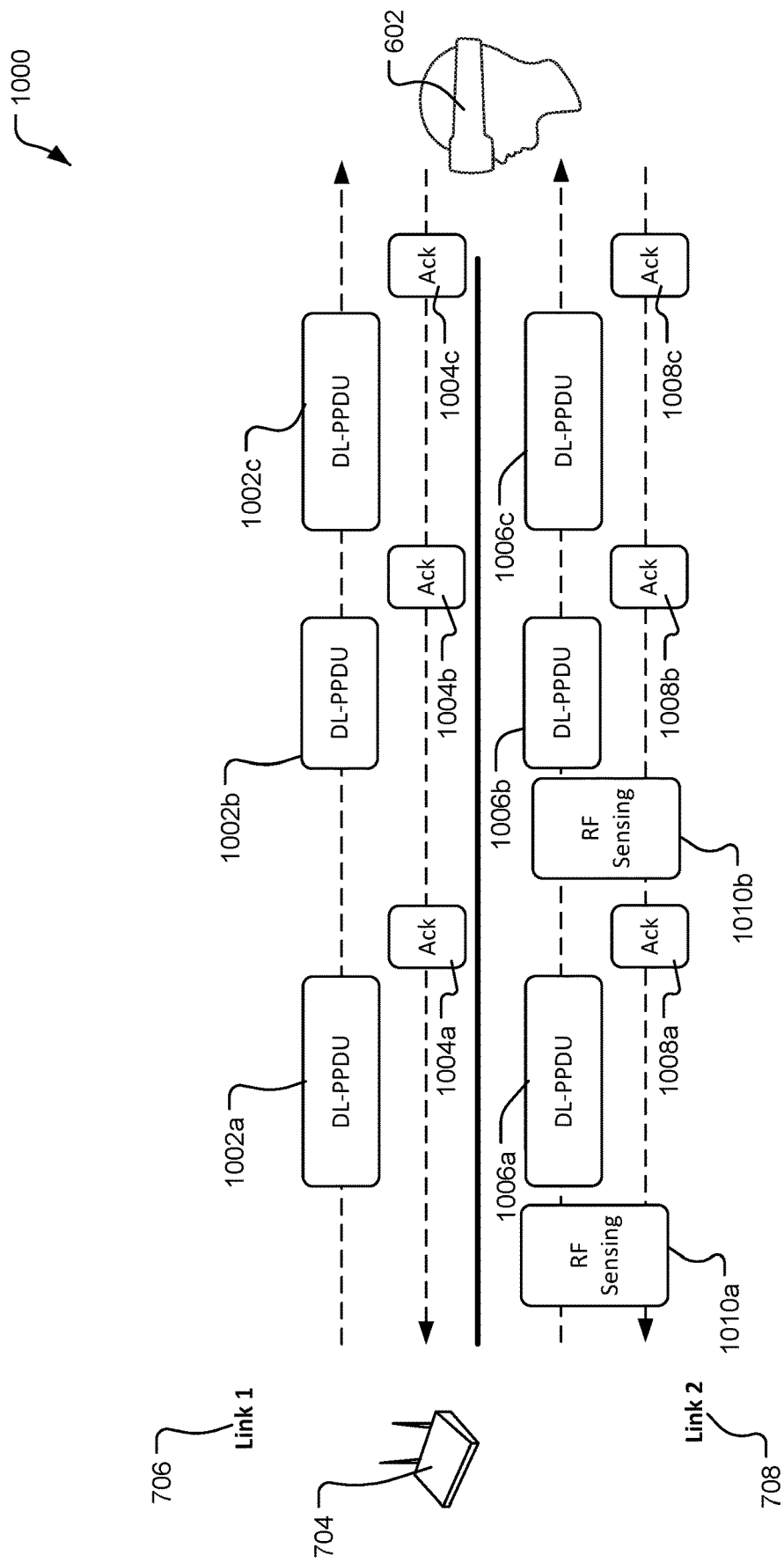
FIG. 10 is an example signal flow diagram for providing latency sensitive indications using synchronous communications.

Referring to FIG. 10, with further reference to FIG. 7, an example signal flow diagram 1000 for providing latency sensitive indications using synchronous communications is shown. The diagram 1000 includes the HMD 602 and the AP 704 as described in FIG. 8 but in a synchronous mode. In a synchronous mode, the traffic on the second link 708 is aligned with the traffic on the first link 706 for both starting and ending times. Thus, the DL-PPDUs on the first link 706 (e.g., 1002a, 1002b, 1002c) are aligned with the respective DL-PPDUs on the second link 708 (e.g., 1006a, 1006b, 1006c). For example, the DL-PPDU end time for the first DL-PPDUs 1002a, 1006a are aligned. The same alignment requirement is also applied to the other DL-PPDUs 1002b, 1006b, 1002c, 1006c. The corresponding block acknowledgement frames on the respective links are also aligned. As depicted, the respective first Ack frames 1004a, 1008a, second Ack frames 1004b, 1008b, and third Ack frames 1004c, 1008c are provided in the same time frame. The latency sensitive information, such as the RF sensing information and motion information, may be embedded in the UL block acknowledgement frames on either the first or second links 706, 708. RF sensing operations 1010a, 1010b may be performed on the second link 708, however, the AP 704 may be configured to halt DL-PPDU on both links during the RF sensing operations.

Figure 11:
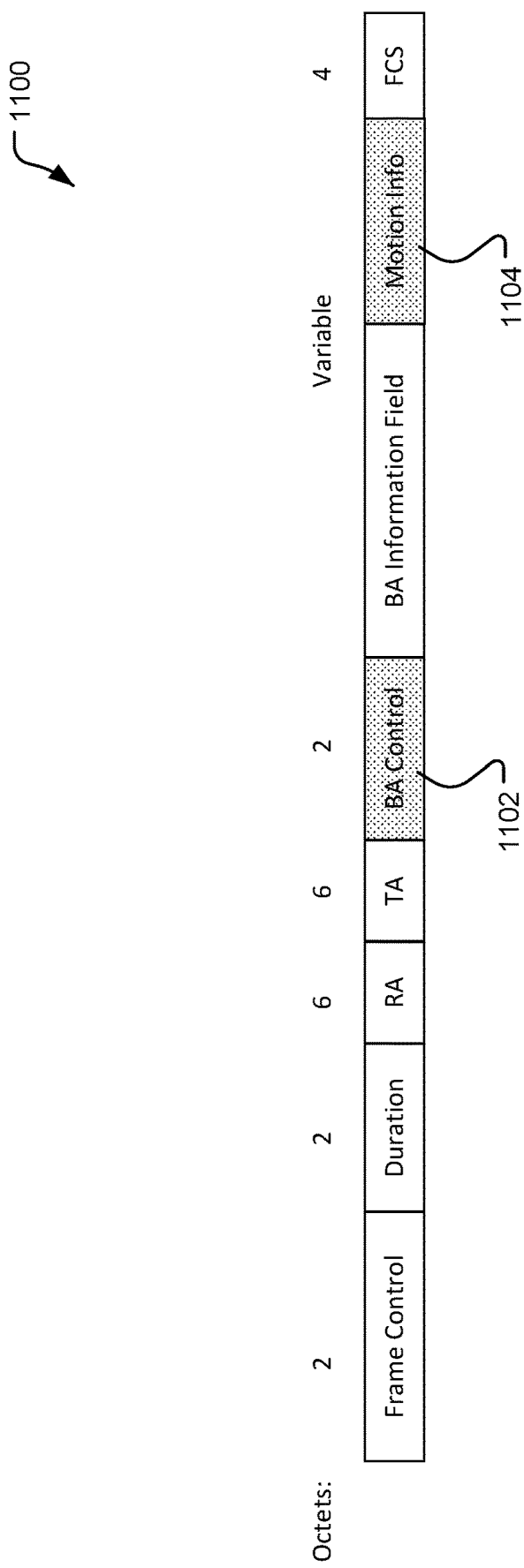
FIG. 11 is an example block acknowledgment frame for providing latency sensitive indications.

Referring to FIG. 11, with further reference to FIGS. 7-10, an example block acknowledgment frame 1100 for providing latency sensitive indications is shown. The frame 1100 is based on the 802.11 MAC frame format and may include standard frames such as a frame control field indicating the type of frame format (e.g., control, management, or data), a duration field indicating at time a channel will be allocated for transmission of the frame, Receiver and Transmitter Address fields indicating the MAC addresses of the AP 704 and the HMD 602, a block acknowledgment information containing protocol data, and a frame check sequence (FCS) field as a redundancy check. The frames and indicated memory sizes (i.e., octets) are examples and not limitations. In an embodiment, a block acknowledgment control field 1102 may be used by the HMD 602 to provide RF sensing and/or motion based information to the AP 704. For example, one or more reserve bits in the BA control field 1102 may be used to indicate an urgent observation or emergency to the AP 704, and the AP 704 (or the network server 606) may be configured to schedule additional RF sensing operations based on BA control filed 1102. In an embodiment, a motion information field 1104 may include a few bytes of motion and/or RF sensing information to the AP 704. In a multidevice network, the use of the UL block Ack frame 1100 avoids the contention issues associated with the attempts of each of the devices to provide UL data frames. Other modifications to the UL block acknowledgment frame may be used to provide latency sensitive RF sensing and/or motion information. In an embodiment, the AP 704 may be configured to interrupt the DL-PPDU on the first and second links based on the information in the UL block Ack frame 1100. For example, RF sensing information may indicate a potential danger to the user (e.g., an approaching object), and the AP 704 may stop the DL-PPDU stream and provide an alert to the user via the HMD 602.

Figure 12:
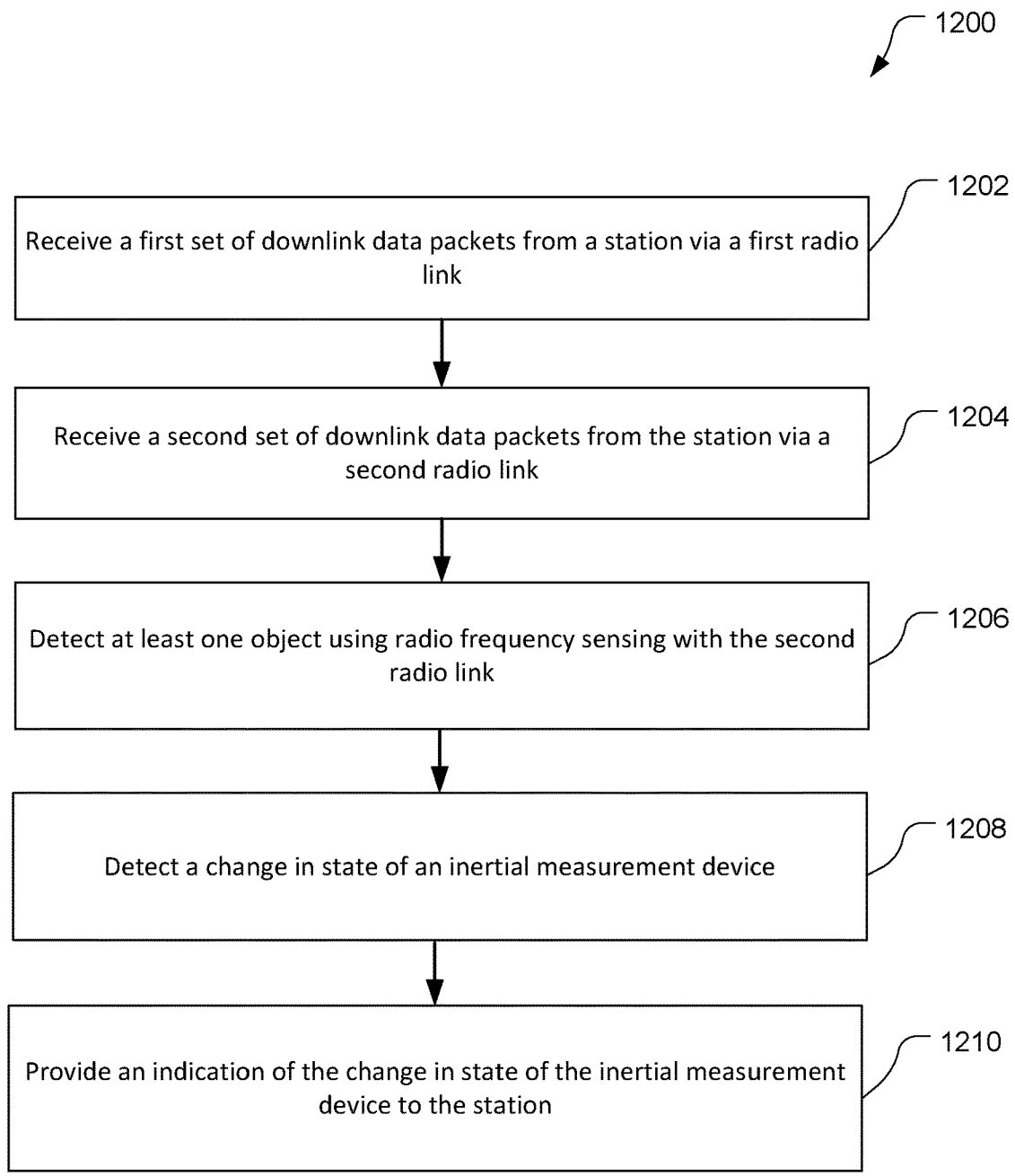
FIG. 12 is an example process flow for a method for providing a latency sensitive indication to a station.

Referring to FIG. 12, with further reference to FIGS. 1-11, a method 1200 for providing a latency sensitive indication to a station includes the stages shown. The method 1200 is, however, an example and not limiting. The method 1200 may be altered, e.g., by having stages added, removed, rearranged, combined, performed concurrently, and/or having single stages split into multiple stages.

At stage 1202, the method includes receiving a first set of downlink data packets from a station via a first radio link. A UE 200, including a general-purpose processor 230 and a transceiver 215, is a means for receiving the first set of downlink data packets. The HMD 602 may include some or all of the components of the UE 200 and may be configured as a MLD. The HMD 602 may be configured to operate with the IEEE 802.11be Wi-Fi standard as an MLO on one or more frequency bands/channels such as 2.4 GHz, 5 GHz and 6 Ghz. The HMD 602 may include a plurality of transceivers to communicate with an access point (AP) 704 via a first link 706 (e.g., in the Wi-Fi 5 GHz band) while simultaneously communicating or performing RF sensing with a second link 708 (e.g., in the Wi-Fi 6 GHz band). In operation, the AP 704 may be communicatively coupled to a network server and configured to send downlink data packets, such as the DL-PPDU to the HMD 602 using the first link 706. For example, the DL-PPDU may be streaming media for a gaming application and may be latency sensitive.

At stage 1204, the method includes receiving a second set of downlink data packets from the station via a second radio link. The UE 200, including the general-purpose processor 230 and the transceiver 215, is a means for receiving the second set of down link packets. In an embodiment, the second set of downlink data packets may be the DL-PPDU transmitted from the AP 704 via the second link 708. The sizes of the second set of downlink data packets on the second link 708 may vary based on the airtime utilized for RF sensing and UL data. In an embodiment, the AP 704 and the HMD 602 may be configured for simultaneous transmit and receive, and may utilize the first radio link and the second radio link in an asynchronous mode such that traffic on the links does not need to be aligned.

At stage 1206, the method includes detecting at least one object using radio frequency sensing with the second radio link. The UE 200, including the transceiver 215 and the general-purpose processor 230, is a means for detecting at least one object. In an embodiment, the HMD 602 may include some or all of the components of the UE 200 and may be configured to perform RF sensing as described in FIG. 4 with the second link 708. For example, the HMD 602 may transmit a radio frequency signal 412*a* towards an object. A reflected signal 412*b* is the portion of the RF signal 412*a* that is reflected by the object and received by the one or more receive antennas in the HMD 602. In an example, the HMD 602 may include additional receive chains to enable beamforming/direction detection to enable the HMD 602 to compute an angle of arrival (AoA) for a received signal. The receive chains may also receive a transmission leakage signal concurrently with the transmission of the RF signal 412*a*. The transmission leakage may be conductive and/or radiated interference depending on the configuration of the HMD 602. In an embodiment, the HMD 602 may be configured for bistatic RF sensing operations, such as described in FIG. 6B with the second radio link.

At stage 1208, the method includes detecting a change in state of an inertial measurement device. The UE 200, including the general-purpose processor 230 and the IMU 270, is a means for detecting a change in state of the inertial measurement device. In an example, the inertial measurement device may be one or more accelerometers 273 and/or gyroscopes 274 configured to output a measurement signal (e.g., meters per second squared, radians/sec) indicating the current motion of the HMD 602. The change in state may be determined by detecting a signal based on established threshold settings (e.g., 0.1, 0.5, 1 m/s$^2$, etc.; 0.5, 1, 4, 10, 15 rad/s, etc.). A measurement which meets or exceeds a threshold setting may indicate a change in state of the IMU 270. In an example, the change in state may be used to trigger RF sensing operations and/or provide updated information regarding proximate objects detected with RF sensing operations. For example, the change in state of the IMU 270 may indicate that the orientation of the HMD 602 has changed and additional RF sending operations may be performed to sense the environment based on the new orientation.

At stage 1210, the method includes providing an indication of the change in state of the inertial measurement device to the station. The UE 200, including the transceiver 215 and the general-purpose processor 230, is a means for providing the indication of the change in state of the IMU. In an embodiment, the state of the inertial measurement device (e.g., measurement values) may be provided in the indication. The indication may be included in one or more block acknowledgement frames, such as the block acknowledgement frame 1100. For example, in an embodiment, the Ack frames sent in response to receiving a DL-PPDU via the first radio link may include the indication. In an example, the Ack frames sent in response to receiving a DL-PPDU via the second radio link may include the indication. In an example, the indication may be included in one or more UL data frames transmitted to the AP 704 from the HMD 602. The AP 704 may be configured to schedule RF sensing operations based at least in part on the change in state of the IMU 270. For example, an increase of RF sensing operations may be scheduled in response to indication of the change in state of the IMU 270. The periodicity and the RF sensing parameters (e.g., duration, bandwidth) may be based at least in part on the indication of the change in state. In an example, the AP 704 may be configured to halt DL-PPDU and generate an alert based on high magnitude changes in the IMU (e.g., such as when the HMD 602 may be knocked off the user, or otherwise removed from the user's head). In an example, the indication may include information associated with the object, such as a range (distance) to the object based on the RF sensing operations performed at stage 1206. Other information, such as the size of the object, velocity of the object, direction of motion of the object may also be provided as the indication.

In an embodiment, the station in the method 1200 may be configured for asynchronous communications with simultaneous transmit and receive on the first radio link and the second radio link. The indication of the at least one object detected at stage 1206 may be included in an uplink block acknowledgment transmitted to the station via the first radio link, or in an uplink data packet transmitted to the station via the second radio link. In an embodiment, the station in the method 1200 may be configured for synchronous communication with the first radio link and the second radio link, and the indication of the at least one object may be included in an uplink block acknowledgment transmitted to the station via the first radio link, or in an uplink block acknowledgement transmitted to the station via the second radio link.

Figure 13:
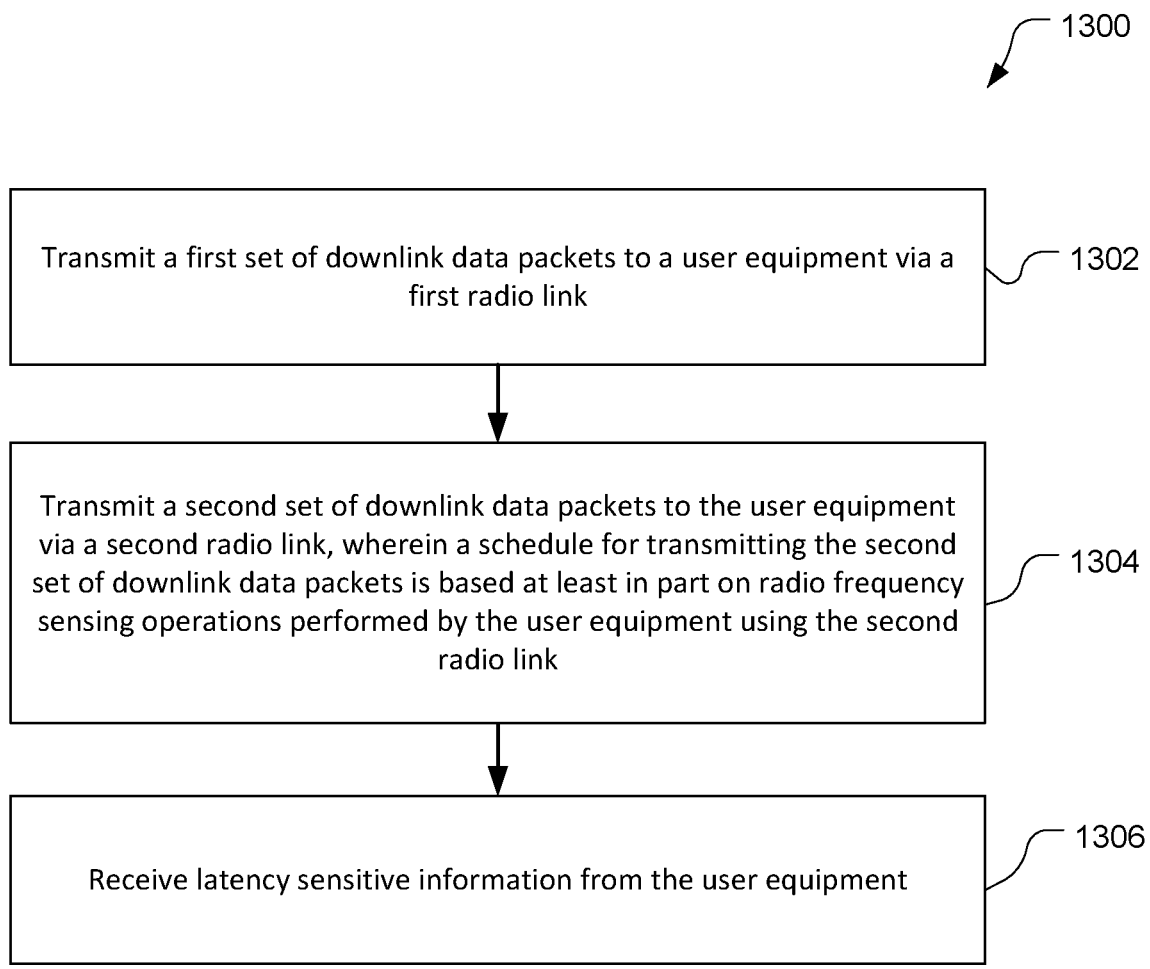
FIG. 13 is an example process flow for a method for receiving latency sensitive information.

Referring to FIG. 13, with further reference to FIGS. 1-11, a method 1300 for receiving latency sensitive information includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes transmitting a first set of downlink data packets to a user equipment via a first radio link. An AP 300, including the processor 310 and the transceiver 315, is a means for transmitting the first set of downlink data packets. The AP 704 may include some or all of the components of the AP 300 and may be configured as a MLD. The AP 704 may be configured to operate with the IEEE 802.11be Wi-Fi standard as an MLO on one or more frequency bands/channels such as 2.4 GHz, 5 GHz and 6 Ghz. The AP 704 may include a plurality of transceivers to communicate with the user equipment, such as one or more HMD 602, via a first link 706 (e.g., in the Wi-Fi 5 GHz band) while simultaneously communicating or performing RF sensing with a second link 708 (e.g., in the Wi-Fi 6 GHz band). In operation, the AP 704 may be communicatively coupled to a network server and configured to send downlink data packets, such as DL-PPDU to the HMD 602 using the first link 706. For example, the DL-PPDU may be streaming media for a gaming application and may be latency sensitive.

At stage 1304, the method includes transmitting a second set of downlink data packets to the user equipment via a second radio link, wherein a schedule for transmitting the second set of downlink data packets is based at least in part on radio frequency sensing operations performed by the user equipment using the second radio link. The AP 300, including the processor 310 and the transceiver 315, is a means for transmitting the second set of downlink data packets. In an embodiment, the first radio link may be used solely for AP-to-STA DL-PPDUs and UL Block acknowledgments to maintain the continuity and low-latency of DL streaming. For example, referring to FIG. 8, the download data packets may include the DL-PPDUs 802*a*, 802*b*, 802*c*. The second radio link may time share RF sensing operations with additional DL-PPDU data packets. For example, referring to FIG. 8, the second radio link may have configured time periods for RF sensing operations 810*a*, 810*b* and downlink data packets such as the DL-PPDUs 806*a*, 806*b*, 806*c*. The RF sensing operations 810*a*, 810*b* may be monostatic or bistatic as described in FIGS. 6A and 6B. In an example, the second radio link may also be configured to enable the UL data such as the UL data frames 812*a*, 812*b*. In an example, each of the RF sensing operations may utilize known transmission durations (e.g., approximately 200 microseconds of airtime), and an AP may be configured to utilize these known values for the RF sensing operations to pre-allocate the time for the downlink data packets (e.g., DL-PPDU). In an example, the second radio link may also allow airtime for UL data based on a fixed size of motion information (e.g., 5, 10, 15, 20, 30 bytes, etc.), and the AP may be configured to also utilize the known UL data airtime to pre-allocate the time for the DL-PPDU on the second radio link. The scheduling of the RF sensing operations may be changed based on recent proximity observations and reported to the AP 300 using one or more of the UL block Ack frames 904*a*, 904*b*, 904*c*. In an example, the HMD 602 may provide the AP 300 with an indication of the periodicity in which the RF sensing will be performed. In an example, the indication may be a time period (e.g., 1, 2, 5 10 100 msecs, etc.), and/or a duration of the RF sensing operations in each interval (e.g., 100, 200, 500 microseconds, etc.). Other indications may be used to inform the AP 300 of the timing for the RF sensing operations.

At stage 1306, the method includes receiving latency sensitive information from the user equipment. The AP 300, including the processor 310 and the transceiver 315, is a means for receiving the latency sensitive information. In an example, the latency sensitive information may be motion information. The IMU 270 may include one or more accelerometers 273 and/or gyroscopes 274 configured to output a measurement signal (e.g., meters per second squared, radians/sec) indicating the current motion of the user equipment. In an example, the latency sensitive information may correspond to object detection information obtained during RF sensing operations. The object detection information may include one or more parameters associated with a detected object, such as a range, a speed, a direction of motion, a size of the object, estimated time of arrival/collision, a classification, a change in RF sending periodicity, etc. In an example, the latency sensitive information may be included in one or more block acknowledgement frames, such as the block acknowledgement frame 1100. The Ack frames sent by the user equipment in response to receiving a downlink data packet at stage 1302 via the first radio link may include the motion information. In an example, an Ack frames sent by the user equipment in response to receiving the downlink data packets a stage 1304 via the second radio link may include the motion information. In an example, the latency sensitive information may be included in one or more UL data frames transmitted by the user equipment.

In an embodiment, the user equipment in the method 1300 may be configured for asynchronous communications with simultaneous transmit and receive on the first radio link and the second radio link, and the motion information may be included an uplink block acknowledgment transmitted by the user equipment via the first radio link and/or included in an uplink data packet transmitted by the user equipment via the second radio link. In an embodiment, the user equipment in the method 1300 may be configured for synchronous communication with the first radio link and the second radio link, and the motion information may be included in an uplink block acknowledgment transmitted by the user equipment via the first radio link, and/or included in an uplink block acknowledgment transmitted by the user equipment via the second radio link. The motion information may be based at least in part on inertial measurements obtained by the user equipment and/or at least in part on the radio frequency sensing operations performed by the user equipment. The method 1300 may include transmitting an alert to the user equipment based at least in part on the motion information, and may halt the transmission of the first set of data packets and the second set of data packets based at least in part on the motion information. In an example, the radio frequency sensing operations performed by the user equipment may include transmitting one or more radio frequency sensing signals from the user equipment (e.g., monostatic sensing), and/or one or more radio frequency sensing signals transmitted by another station (e.g., bistatic sensing).

Figure 14:
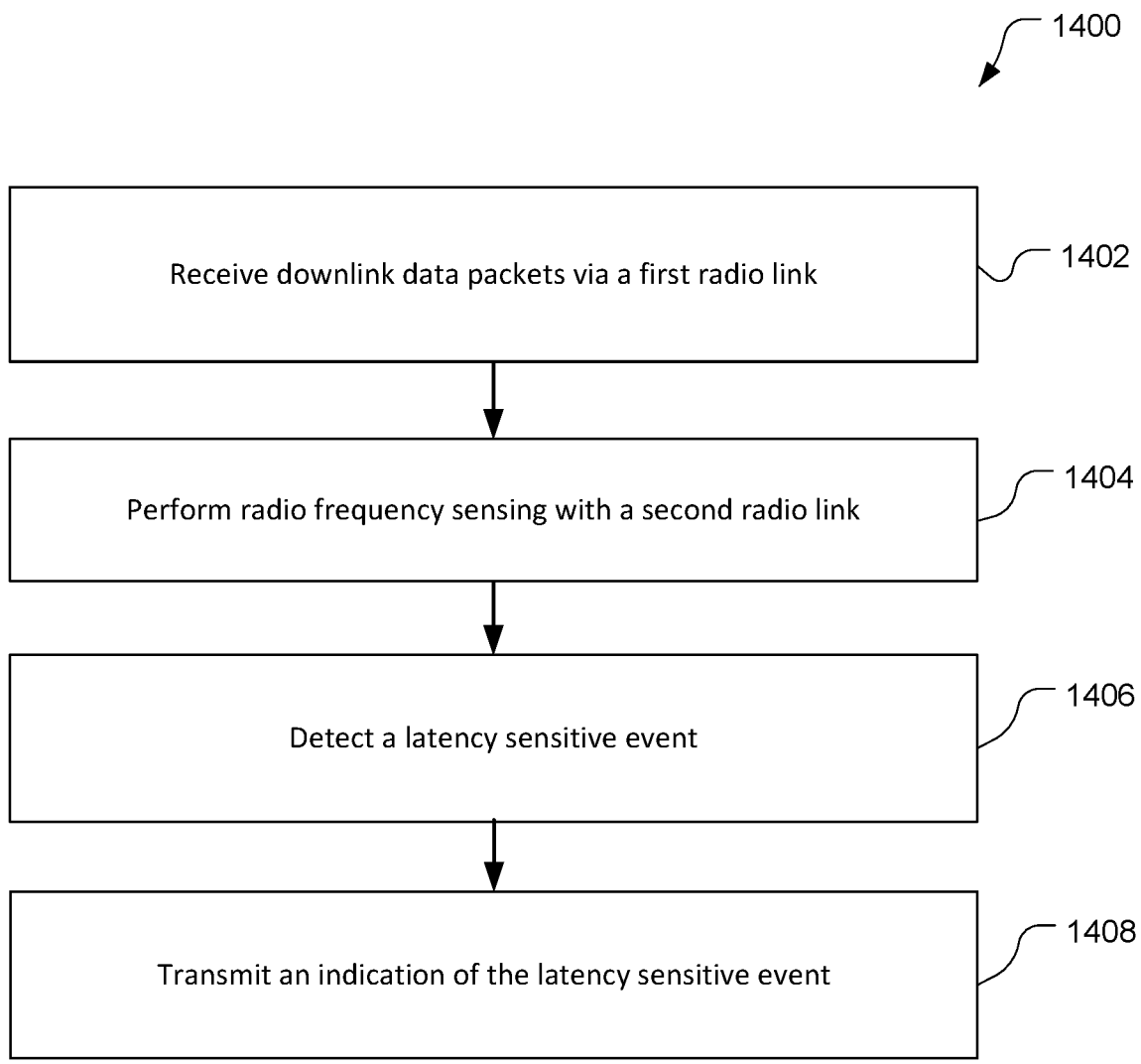
FIG. 14 is an example process flow for a method of providing latency sensitive information with a multi-link device.

Referring to FIG. 14, with further reference to FIGS. 1-11, a method 1400 for providing a latency sensitive information with a multi-link device includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes receiving downlink data packets via a first radio link. A UE 200, including a general-purpose processor 230 and a transceiver 215, is a means for receiving the downlink data packets. The HMD 602 may include some or all of the components of the UE 200 and may be configured as an MLD. The HMD 602 may be configured to operate with the IEEE 802.11be Wi-Fi standard as an MLO on one or more frequency bands/channels such as 2.4 GHz, 5 GHz and 6 Ghz. The HMD 602 may include a plurality of transceivers to communicate with an access point (AP) 704 via a first link 706 (e.g., in the Wi-Fi 5 GHz band) while simultaneously communicating or performing RF sensing with a second link 708 (e.g., in the Wi-Fi 6 GHz band). In operation, the AP 704 may be communicatively coupled to a network server and configured to send downlink data packets, such as the DL-PPDU to the HMD 602 using the first link 706. For example, the DL-PPDU may be streaming media for a gaming application and may be latency sensitive.

At stage 1404, the method includes performing radio frequency sensing with a second radio link. The UE 200, including the transceiver 215 and the general-purpose processor 230, is a means for performing RF sensing with the second radio link. In an example, the HMD 602 may include some or all of the components of the UE 200 and may be configured to perform RF sensing as described in FIG. 4 with the second link 708. For example, the HMD 602 may transmit a radio frequency signal 412*a* towards an object. A reflected signal 412*b* is the portion of the RF signal 412*a* that is reflected by the object and received by the one or more receive antennas in the HMD 602. The HMD 602 may include additional receive chains to enable beamforming/direction detection to enable the HMD 602 to compute an angle of arrival (AoA) for a received signal. The receive chains may also receive a transmission leakage signal concurrently with the transmission of the RF signal 412*a*. The transmission leakage may be conductive and/or radiated interference depending on the configuration of the HMD 602. In an example, the HMD 602 may be configured for bistatic RF sensing operations, such as described in FIG. 6B with the second radio link.

At stage 1406, the method includes detecting a latency sensitive event. The UE 200, including the general-purpose processor 230 and the IMU 270, is a means for detecting the latency sensitive event. In an example, the latency sensitive event may be detecting a motion in the HMD 602. The HMD 602 may include the IMU 207, with one or more accelerometers 273 and/or gyroscopes 274 configured to output a measurement signal (e.g., meters per second squared, radians/sec) indicating the current motion of the HMD 602. The change in state may be determined by detecting a signal based on established threshold settings (e.g., 0.1, 0.5, 1 m/s$^2$, etc.; 0.5, 1, 4, 10, 15 rad/s, etc.). In an example, the latency sensitive event may correspond to object detection information obtained during RF sensing operations. Other latency sensitive events, such as user inputs (e.g., in a real-time gaming application), a change in RF sending periodicity, and alerts may be detected by the general-purpose processor 230.

At stage 1408, the method includes transmitting an indication of the latency sensitive event. The UE 200, including the transceiver 215 and the general-purpose processor 230, is a means for transmitting the indication of the latency sensitive event. In an example, an AP, such as the AP 704, is configured to receive the indication of the latency sensitive event. The indication of the latency sensitive event may be received by a network server, or other controller, which may be configured to execute an action based at least in part on the latency sensitive event. In an example, the indication may be based on a state of the inertial measurement device. For example, device output and/or measurement values may be provided as the indication. The indication may include a range (distance) to the object based on the RF sensing operations. Other indications, such as the size of the object, velocity of the object, direction of motion of the object may also be transmitted as uplink data or within a block acknowledgment. For example, in an embodiment, the Ack frames sent in response to receiving the downlink data packets via the first radio link may include the indication.

In an embodiment, the method 1400 may be based on asynchronous communication protocols with simultaneous transmit and receive on the first radio link and the second radio link. The indication of the latency sensitive event may be included in an uplink block acknowledgment transmitted via the first radio link, or in an uplink data packet transmitted via the second radio link. In an embodiment, the method 1400 may be based on synchronous communication protocols utilizing the first radio link and the second radio link. The indication of latency sensitive event may be included in an uplink block acknowledgment transmitted via the first radio link, or in an uplink block acknowledgement transmitted via the second radio link.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method of providing latency sensitive information with a multi-link device, comprising:
   receiving downlink data packets from a station via a first radio link;
   performing radio frequency sensing with a second radio link;
   detecting a latency sensitive event; and
   transmitting an indication of the latency sensitive event.
2. The method of clause 1 wherein detecting the latency sensitive event includes detecting a motion with the multi-link device.
3. The method of clause 1 wherein detecting the latency sensitive event includes detecting an object with the radio frequency sensing.
4. The method of clause 1 wherein detecting the latency sensitive event includes detecting a change in a periodicity of the radio frequency sensing performed by the multi-link device.
5. The method of clause 1 wherein detecting the latency sensitive event includes receiving a user input with the multi-link device.
6. The method of clause 1 wherein the indication of the latency sensitive event is transmitted as uplink data on the second radio link.
7. The method of clause 1 wherein the indication of the latency sensitive event is included in a block acknowledgment transmitted on the first radio link.
8. The method of clause 1 wherein the indication of the latency sensitive event is included in a block acknowledgment transmitted on the second radio link.
9. The method of clause 1 wherein the multi-link device is configured for synchronous communication with the first radio link and the second radio link.
10. The method of clause 1 wherein the multi-link device is configured for asynchronous communication with the first radio link and the second radio link.
11. A method of receiving latency sensitive information, comprising:
    transmitting a first set of downlink data packets to a user equipment via a first radio link;
    transmitting a second set of downlink data packets to the user equipment via a second radio link, wherein a schedule for transmitting the second set of downlink data packets is based at least in part on radio frequency sensing operations performed by the user equipment using the second radio link; and receiving latency sensitive information from the user equipment.

12. The method of clause 11 wherein the user equipment is configured for asynchronous communications with simultaneous transmit and receive on the first radio link and the second radio link.
13. The method of clause 12 wherein receiving the latency sensitive information includes receiving the latency sensitive information in an uplink block acknowledgment transmitted by the user equipment via the first radio link.
14. The method of clause 12 wherein receiving the latency sensitive information includes receiving the latency sensitive information in an uplink data packet transmitted by the user equipment via the second radio link.
15. The method of clause 11 wherein the user equipment is configured for synchronous communication with the first radio link and the second radio link.
16. The method of clause 15 wherein receiving the latency sensitive information includes receiving the latency sensitive information in an uplink block acknowledgment transmitted by the user equipment via the first radio link.
17. The method of clause 15 wherein receiving the latency sensitive information includes receiving the latency sensitive information in an uplink block acknowledgment transmitted by the user equipment via the second radio link.
18. The method of clause 11 wherein the user equipment is a head mounted device.
19. The method of clause 11 wherein the latency sensitive information is motion information based at least in part on inertial measurements obtained by the user equipment.
20. The method of clause 11 wherein the latency sensitive information is based at least in part on the radio frequency sensing operations performed by the user equipment.
21. The method of clause 11 wherein the latency sensitive information is based at least in part on a user input to the user equipment.
22. The method of clause 11 wherein the latency sensitive information is based at least in part on an indication of a change in a periodicity of the radio frequency sensing operations performed by the user equipment.
23. The method of clause 11 further comprising transmitting an alert to the user equipment based at least in part on the latency sensitive information.
24. The method of clause 11 further comprising halting the transmitting of the first set of downlink data packets or the second set of downlink data packets based at least in part on the latency sensitive information.
25. The method of clause 11 wherein the radio frequency sensing operations performed by the user equipment include transmitting one or more radio frequency sensing signals from the user equipment.
26. The method of clause 11 further comprising transmitting one or more radio frequency sensing signals with the second radio link during a time period when the user equipment is performing the radio frequency sensing operations.
27. The method of clause 11 wherein the schedule of the radio frequency sensing operations is based at least in part on previous proximity observations.
28. A method of providing radio frequency sensing object detection information, comprising:

receiving a first set of downlink data packets from a station via a first radio link;

receiving a second set of downlink data packets from the station via a second radio link;

detecting at least one object using radio frequency sensing with the second radio link;

detecting a change in state of an inertial measurement device; and providing an indication of the change in state of the inertial measurement device to the station.

29. The method of clause 28 further comprising providing an indication of the at least one object to the station.
30. The method of clause 28 wherein the station is configured for asynchronous communications with simultaneous transmit and receive on the first radio link and the second radio link.
31. The method of clause 30 wherein providing the indication of the change in state of the inertial measurement device includes including the indication in an uplink block acknowledgment transmitted to the station via the first radio link.
32. The method of clause 30 wherein providing the indication of the change in state of the inertial measurement device includes including the indication in an uplink data packet transmitted to the station via the second radio link.
33. The method of clause 28 wherein the station is configured for synchronous communication with the first radio link and the second radio link.
34. The method of clause 33 wherein providing the indication of the change in state of the inertial measurement device includes including the indication in an uplink block acknowledgment transmitted to the station via the first radio link.
35. The method of clause 34 wherein providing the indication of the inertial measurement device includes including the indication in an uplink block acknowledgement transmitted to the station via the second radio link.
36. The method of clause 28 further comprising changing a periodicity of the radio frequency sensing based at least in part on the change in state of the inertial measurement device.
37. An apparatus, comprising:

a memory;

at least one transceiver;

at least one processor communicatively coupled to the memory and the at least one transceiver, and configured to:

receive downlink data packets from a station via a first radio link;

perform radio frequency sensing with a second radio link;

detect a latency sensitive event; and transmit an indication of the latency sensitive event.

38. The apparatus of clause 37 further comprising an inertial measurement unit communicatively coupled to the at least one processor, and the at least one processor is further configured to detect a motion with the inertial measurement unit, wherein the motion is the latency sensitive event.
39. The apparatus of clause 37 wherein the at least one processor is further configured to detect an object with the radio frequency sensing as the latency sensitive event.

40. The apparatus of clause 37 wherein the at least one processor is further configured to detect a change in a periodicity of the radio frequency sensing as the latency sensitive event.
41. The apparatus of clause 37 wherein the at least one processor is further configured to receive a user input with the apparatus as the latency sensitive event.
42. The apparatus of clause 37 wherein the at least one processor is further configured to transmit the indication of the latency sensitive event as uplink data on the second radio link.
43. The apparatus of clause 37 wherein the at least one processor is further configured to transmit the indication of the latency sensitive event in a block acknowledgment on the first radio link.
44. The apparatus of clause 37 wherein the at least one processor is further configured to transmit the indication of the latency sensitive event in a block acknowledgment on the second radio link.
45. The apparatus of clause 37 wherein the apparatus is configured for synchronous communication with the first radio link and the second radio link.
46. The apparatus of clause 37 wherein the apparatus is configured for asynchronous communication with the first radio link and the second radio link.
47. An apparatus, comprising:
a memory;
at least one transceiver;
at least one processor communicatively coupled to the memory and the at least one transceiver, and configured to:
transmit a first set of downlink data packets to a user equipment via a first radio link;
transmit a second set of downlink data packets to the user equipment via a second radio link, wherein a schedule for transmitting the second set of downlink data packets is based at least in part on radio frequency sensing operations performed by the user equipment using the second radio link; and
receive latency sensitive information from the user equipment.
48. The apparatus of clause 47 wherein the user equipment is configured for asynchronous communications with simultaneous transmit and receive on the first radio link and the second radio link.
49. The apparatus of clause 48 wherein the at least one processor is further configured to receive the latency sensitive information in an uplink block acknowledgment transmitted by the user equipment via the first radio link.
50. The apparatus of clause 48 wherein the at least one processor is further configured to receive the latency sensitive information in an uplink data packet transmitted by the user equipment via the second radio link.
51. The apparatus of clause 47 wherein the apparatus is configured for synchronous communication with the first radio link and the second radio link.
52. The apparatus of clause 51 wherein the at least one processor is further configured to receive the latency sensitive information in an uplink block acknowledgment transmitted by the user equipment via the first radio link.
53. The apparatus of clause 51 wherein the at least one processor is further configured to receive the latency sensitive information in an uplink block acknowledgment transmitted by the user equipment via the second radio link.
54. The apparatus of clause 47 wherein the user equipment is a head mounted device.
55. The apparatus of clause 47 wherein the latency sensitive information is motion information based at least in part on inertial measurements obtained by the user equipment.
56. The apparatus of clause 47 wherein the latency sensitive information is based at least in part on the radio frequency sensing operations performed by the user equipment.
57. The apparatus of clause 47 wherein the latency sensitive information is based at least in part on a user input to the user equipment.
58. The apparatus of clause 47 wherein the latency sensitive information is based at least in part on an indication of a change in a periodicity of the radio frequency sensing operations performed by the user equipment.
59. The apparatus of clause 47 wherein the at least one processor is further configured to transmit an alert to the user equipment based at least in part on the latency sensitive information.
60. The apparatus of clause 47 wherein the at least one processor is further configured to halt transmitting of the first set of downlink data packets or the second set of downlink data packets based at least in part on the latency sensitive information.
61. The apparatus of clause 47 wherein the radio frequency sensing operations performed by the user equipment include transmitting one or more radio frequency sensing signals from the user equipment.
62. The apparatus of clause 47 wherein the at least one processor is further configured to transmit one or more radio frequency sensing signals with the second radio link during a time period when the user equipment is performing the radio frequency sensing operations.
63. The apparatus of clause 47 wherein the schedule of the radio frequency sensing operations is based at least in part on previous proximity observations.
64. An apparatus, comprising:
a memory;
at least one transceiver;
at least one processor communicatively coupled to the memory and the at least one transceiver, and configured to:
receive a first set of downlink data packets from a station via a first radio link;
receive a second set of downlink data packets from the station via a second radio link;
detect at least one object using radio frequency sensing with the second radio link;
detect a change in state of an inertial measurement device; and
provide an indication of the change in state of the inertial measurement device to the station.
65. The apparatus of clause 64 wherein the at least one processor is further configured to provide an indication of the at least one object to the station.
66. The apparatus of clause 64 wherein the station is configured for asynchronous communications with simultaneous transmit and receive on the first radio link and the second radio link.
67. The apparatus of clause 66 wherein the at least one processor is further configured to provide the indication of the change in state of the inertial measurement device in an uplink block acknowledgment transmitted to the station via the first radio link.

68. The apparatus of clause 66 wherein the at least one processor is further configured to provide the indication of the change in state of the inertial measurement device in an uplink data packet transmitted to the station via the second radio link.

69. The apparatus of clause 64 wherein the station is configured for synchronous communication with the first radio link and the second radio link.

70. The apparatus of clause 69 wherein the at least one processor is further configured to provide the indication of the change in state of the inertial measurement device in an uplink block acknowledgment transmitted to the station via the first radio link.

71. The apparatus of clause 69 wherein the at least one processor is further configured to provide the indication of the inertial measurement device in an uplink block acknowledgement transmitted to the station via the second radio link.

72. The apparatus of clause 64 wherein the at least one processor is further configured to change a periodicity of the radio frequency sensing based at least in part on the change in state of the inertial measurement device.

73. An apparatus for providing latency sensitive information with a multi-link device, comprising:
means for receiving downlink data packets from a station via a first radio link;
means for performing radio frequency sensing with a second radio link;
means for detecting a latency sensitive event; and
means for transmitting an indication of the latency sensitive event.

74. An apparatus for receiving latency sensitive information from a user equipment, comprising:
means for transmitting a first set of downlink data packets to the user equipment via a first radio link;
means for transmitting a second set of downlink data packets to the user equipment via a second radio link, wherein a schedule for transmitting the second set of downlink data packets is based at least in part on radio frequency sensing operations performed by the user equipment using the second radio link; and
means for receiving latency sensitive information from the user equipment.

75. An apparatus for providing radio frequency sensing object detection information, comprising:
means for receiving a first set of downlink data packets from a station via a first radio link;
means for receiving a second set of downlink data packets from the station via a second radio link;
means for detecting at least one object using radio frequency sensing with the second radio link;
means for detecting a change in state of an inertial measurement device; and
means for providing an indication of the change in state of the inertial measurement device to the station.

76. A non-transitory processor-readable storage medium comprising processor-readable instructions configured to cause one or more processors to provide latency sensitive information with a multi-link device, comprising:
code for receiving downlink data packets from a station via a first radio link;
code for performing radio frequency sensing with a second radio link;
code for detecting a latency sensitive event; and
code for transmitting an indication of the latency sensitive event.

77. A non-transitory processor-readable storage medium comprising processor-readable instructions configured to cause one or more processors to receive latency sensitive information from a user equipment, comprising:
code for transmitting a first set of downlink data packets to the user equipment via a first radio link;
code for transmitting a second set of downlink data packets to the user equipment via a second radio link, wherein a schedule for transmitting the second set of downlink data packets is based at least in part on radio frequency sensing operations performed by the user equipment using the second radio link; and
code for receiving latency sensitive information from the user equipment.

78. A non-transitory processor-readable storage medium comprising processor-readable instructions configured to cause one or more processors to provide radio frequency sensing object detection information, comprising:
code for receiving a first set of downlink data packets from a station via a first radio link;
code for receiving a second set of downlink data packets from the station via a second radio link;
code for detecting at least one object using radio frequency sensing with the second radio link;
code for detecting a change in state of an inertial measurement device; and
code for providing an indication of the change in state of the inertial measurement device to the station.

The invention claimed is:

1. A method of receiving latency sensitive information, comprising:
transmitting a first set of downlink data packets to a user equipment via a first radio link;
performing radio frequency sensing operations on a second radio link;
scheduling transmissions of a second set of downlink data packets to the user equipment via the second radio link based at least in part on an allocation of time required to perform the radio frequency sensing operations on the second radio link; and
receiving the latency sensitive information from the user equipment.

2. The method of claim 1, wherein the user equipment is configured for asynchronous communications with simultaneous transmit and receive on the first radio link and the second radio link.

3. The method of claim 2 wherein receiving the latency sensitive information includes receiving the latency sensitive information in at least one of an uplink block acknowledgment transmitted by the user equipment via the first radio link, or an uplink data packet transmitted by the user equipment via the second radio link.

4. The method of claim 1 wherein the user equipment is configured for synchronous communication with the first radio link and the second radio link.

5. The method of claim 4 wherein receiving the latency sensitive information includes receiving the latency sensitive information in at least one of an uplink block acknowledgment transmitted by the user equipment via the first radio link, or an uplink block acknowledgment transmitted by the user equipment via the second radio link.

6. The method of claim 1 wherein the latency sensitive information is motion information based at least in part on inertial measurements obtained by the user equipment, the radio frequency sensing operations, a user input to the user equipment, an indication of a change in a periodicity of the radio frequency sensing operations performed by the user equipment, or combinations thereof.

7. The method of claim 1 further comprising halting transmitting of downlink data packets to the user equipment via the first radio link or downlink data packets to the user equipment via the second radio link based at least in part on motion information.

8. The method of claim 1 wherein the radio frequency sensing operations include transmitting one or more radio frequency sensing signals.

9. The method of claim 1 wherein performing the radio frequency sensing operations includes transmitting one or more radio frequency sensing signals on the second radio link.

10. The method of claim 1 further comprising scheduling the radio frequency sensing operations based at least in part on previous proximity observations.

11. An apparatus, comprising:
a memory;
at least one transceiver;
at least one processor communicatively coupled to the memory and the at least one transceiver, and configured to:
transmit a first set of downlink data packets to a user equipment via a first radio link;
perform radio frequency sensing operations on a second radio link;
schedule transmissions of a second set of downlink data packets to the user equipment via the second radio link based at least in part on an allocation of time required to perform the radio frequency sensing operations on the second radio link; and
receive latency sensitive information from the user equipment.

12. The apparatus of claim 11 wherein the user equipment is configured for asynchronous communications with simultaneous transmit and receive on the first radio link and the second radio link.

13. The apparatus of claim 12 wherein the at least one processor is further configured to receive the latency sensitive information in an uplink block acknowledgment transmitted by the user equipment via the first radio link, or in an uplink data packet transmitted by the user equipment via the second radio link.

14. The apparatus of claim 11 wherein the apparatus is configured for synchronous communication with the first radio link and the second radio link.

15. The apparatus of claim 14 wherein the at least one processor is further configured to receive the latency sensitive information in an uplink block acknowledgment transmitted by the user equipment via the first radio link, or in an uplink block acknowledgment transmitted by the user equipment via the second radio link.

16. The apparatus of claim 11 wherein the latency sensitive information is motion information based at least in part on inertial measurements obtained by the user equipment, the radio frequency sensing operations, a user input to the user equipment, an indication of a change in a periodicity of the radio frequency sensing operations performed by the user equipment, or combinations thereof.

17. The apparatus of claim 11 wherein the at least one processor is further configured to halt transmitting of downlink data packets to the user equipment via the first radio link or downlink data packets to the user equipment via the second radio link based at least in part on motion information.

18. The apparatus of claim 11 wherein the radio frequency sensing operations include transmitting one or more radio frequency sensing signals.

19. The apparatus of claim 11 wherein the at least one processor is further configured to transmit one or more radio frequency sensing signals with the second radio link.

20. The apparatus of claim 11 wherein the at least one processor is further configured to schedule the radio frequency sensing operations based at least in part on previous proximity observations.

* * * * *